(12) United States Patent
Bosworth et al.

(10) Patent No.: US 9,645,377 B2
(45) Date of Patent: May 9, 2017

(54) COMPRESSIVE IMAGING SYSTEMS AND METHODS

(71) Applicant: The Johns Hopkins University, Baltimore, MD (US)

(72) Inventors: Bryan T. Bosworth, Baltimore, MD (US); Mark A. Foster, Baltimore, MD (US); Jasper R. Stroud, Baltimore, MD (US); Trac Tran, Baltimore, MD (US); Sang Chin, Baltimore, MD (US); Dung Tran, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 15/018,404

(22) Filed: Feb. 8, 2016

(65) Prior Publication Data
US 2016/0231549 A1     Aug. 11, 2016

Related U.S. Application Data

(60) Provisional application No. 62/113,215, filed on Feb. 6, 2015.

(51) Int. Cl.
*G01J 3/30*       (2006.01)
*G02B 21/00*    (2006.01)

(52) U.S. Cl.
CPC ....... *G02B 21/008* (2013.01); *G02B 21/0032* (2013.01); *G02B 21/0076* (2013.01)

(58) Field of Classification Search
CPC ............. G01N 21/645; G01N 21/6452; G01N 21/6428; G01N 21/6458; G01J 3/4406; G02B 21/00
See application file for complete search history.

(56) References Cited

U.S. PATENT DOCUMENTS 6,256,096 B1 *   7/2001   Johnson ................. G01N 15/14
                                                                356/335
6,731,100 B1 *   5/2004   Hansen .............. G01N 15/1463
                                                                324/637

(Continued)

OTHER PUBLICATIONS

Goda et al., "High-throughput single-micro particle imaging flow analyzer," Proc. Natl. Acad. Sci. U.S.A. (2012).

(Continued)

*Primary Examiner* — Abdullahi Nur
(74) *Attorney, Agent, or Firm* — Venable LLP; Henry J. Daley; Laura G. Remmus

(57) ABSTRACT

A compressive imaging system includes an illumination system arranged to illuminate an object of interest with illumination light, and a detection system configured to detect at least a portion of the illumination light after being at least one of reflected from, scattered from, or transmitted through the object of interest or to detect fluorescent light from the object of interest and to provide an imaging signal. The compressive imaging system further includes an image processing system configured to communicate with the detection system to receive the imaging signal. The illumination light from the illumination system comprises a plurality of light pulses such that each light pulse has a preselected spectrum that is distinguishable from spectra of all other pulses. The image processing system is configured to form an image of the object of interest using information concerning the preselected spectra of the plurality of light pulses.

17 Claims, 12 Drawing Sheets

(56) References Cited

U.S. PATENT DOCUMENTS

| | | | |
|---|---|---|---|
| 6,934,445 | B1 | 8/2005 | Leaird et al. |
| 7,368,084 | B2 | 5/2008 | Sklar et al. |
| 7,671,987 | B2 | 3/2010 | Padmanabhan et al. |
| 8,140,300 | B2 | 3/2012 | Dunne et al. |
| 9,034,257 | B2 | 5/2015 | Covey et al. |
| 2004/0021868 | A1* | 2/2004 | Ortyn .............. C12Q 1/6816 356/419 |
| 2005/0036667 | A1* | 2/2005 | So .............. G06K 9/00127 382/128 |
| 2010/0232675 | A1* | 9/2010 | Ortyn .............. G01N 15/147 382/134 |

OTHER PUBLICATIONS

Goda et al., "Serial time-encoded amplified imaging for real-time observation of fast dynamic phenomena," Nature 458(7242), 1145-1149 (2009).

Khilo et al., "Photonic ADC: overcoming the bottleneck of electronic jitter," Opt. Express 20, 4454-449 (2012).

Lang et al., "Cellular imaging in drug discovery," Nat. Rev. Drug Discov. 5, 343-356 (2006).

Liang et al., "Photonic-assisted multi-channel compressive sampling based on effective time delay pattern," Opt. Express 21, 25700-25707 (2013).

Magalhaes et al., "Active illumination single-pixel camera based on compressive sensing," Appl. Opt. 50, 405-414 (2011).

Mishali et al., "Xampling: Signal acquisition and processing in union of subspaces," IEEE Trans. Signal Process 59, 4719-4734 (2011).

Nakagawa et al., "Sequentially timed all-optical mapping photography (STAMP)," Nature Photon. 8, 695-700 (2014).

Nichols et al., "Beating nyquist with light: a compressively sampled photonic link," Opt. Express 19, 7339-7348 (2011).

Petty, "Spatiotemporal chemical dynamics in living cells: from information trafficking to cell physiology," Biosystems 83, 217-224 (2006).

Rimon et al., "Getting the whole picture: combining throughput with content in microscopy," J. Cell Sci. 124, 3743-3751 (2011).

Solli et al., "Amplified wavelength-time transformation for real-time spectroscopy," Nature Photon. 2, 48-51 (2007).

Studer et al., "Compressive fluorescence microscopy for biological and hyperspectral imaging," Proc. Natl. Acad. Sci. U.S.A. 109, E1679-E1687 (2012).

Takhar et al., "A new compressive imaging camera architecture using optical-domain compression," Proc. SPIE 6065, 606509 (2006).

Valley et al., "Compressive sensing of sparse radio frequency signals using optical mixing," Opt. Lett. 37, 4675-4677 (2012).

Weaver et al., "Advances in high-throughput single-cell microtechnologies," Curr. Opin. Biotechnol. 25, 114-123 (2014).

Wong et al., "Asymmetric-detection time-stretch optical microscopy (ATOM) for ultrafast high-contrast contrast cellular imaging in flow," Sci. Rep. 4 (2014).

Wong et al., "Optical time-stretch confocal microscopy at 1 μm," Opt. Lett. 37, 3330-3332 (2012).

Xing et al., "Serial wavelength division 1 GHz line-scan microscopic imaging," Photon. Res. 2, B31-B34 (2014).

Xu et al., "Megahertz all-optical swept-source optical coherence tomography based on broadband amplified optical time-stretch," in Optics Letters, 39, 622-625 (2014).

Yang et al., "Video compressive sensing using gaussian mixture models," IEEE Trans. Image Process. 23, 4863-4878 (2014).

Arai et al., "Back-side-illuminated image sensor with burst capturing speed of 5.2 Tpixel per second," in Sensors, Cameras, and Systems for Industrial and Scientific Applications XIV, R. Widenhorn and A. Dupret, eds., Proc. SPIE 8659, 865904 (2013).

Asghari et al., "Anamorphic transformation and its application to time-bandwidth compression," Appl. Opt. 52, 6735-6743 (2013).

Asghari et al., "Experimental demonstration of optical real-time data compression," Appl. Phys. Lett. 104, 111101 (2014).

Azeredo-Leme, "Clock jitter effects on sampling: A tutorial," IEEE Circuits Syst. Mag. 11, 26-37 (2011).

Baraniuk, "Compressive sensing," IEEE Signal Process. Mag. 24, 118-124 (2007).

Basiji et al., "Cellular image analysis and imaging by flow cytometry," Clin. Lab. Med. 27, 653-670 (2007).

Bosworth et al., "High-speed flow imaging utilizing spectral-encoding of ultrafast pulses and compressed sensing," in CLEO: 2014, OSA Technical Digest (Optical Society of America, 2014), paper ATh4P.3.

Bosworth et al., "High-speed ultrawideband photonically enabled compressed sensing of sparse radio frequency signals," Opt. Lett. 38, 4892-4895 (2013).

Brouzes et al., "Droplet microfluidic technology for single-cell high-throughput screening," Proc. Natl. Acad. Sci. U.S.A. 106, 14195-14200 (2009).

Candes et al., "An introduction to compressive sampling," IEEE Signal Process. Mag. 25, 21-30 (2008).

Candes et al., "Decoding by linear programming," IEEE Trans. Inf. Theory 51, 4203-4215 (2005).

Candes et al., "Stable signal recovery from incomplete and inaccurate measure-ments," Communications on Pure and Applied Mathematics 59, 1207-1223 (2006).

Candes et al., "Robust uncertainty principles: Exact signal reconstruction from highly incomplete frequency information," IEEE Trans. Inf. Theory 52, 489-509 (2006).

Chan et al., "Two-dimensional spectral-encoding for high speed arbitrary patterned illumination," in CLEO: 2014, OSA Technical Digest (Optical Society of America, 2014), paper STh1H.2.

Chan et al., "Signal reduction in fluorescence imaging using radio frequency-multiplexed excitation by compressed sensing," in Real-time Photonic Measurements, Data Management, and Processing, B. Jalali, M. Li, K. Goda, and M. H. Asghari, eds., Proc. SPIE 9279, 92790U (2014).

Chen et al., "Multiwavelength time-stretch imaging system," Opt. Lett. 39, 2202-2205 (2014).

Chen et al., "Compressive sensing in a photonic link with optical integration," Opt. Lett. 39, 2222-2224 (2014).

Chen et al., "High speed single-pixel imaging via time domain compressive sampling," in CLEO: 2014, OSA Technical Digest (Optical Society of America, 2014), paper JTh2A.132.

Davenport et al., "Introduction to compressed sensing," in "Compressed Sensing: Theory and Applications,", Y. C. Eldar and G. Kutyniok, eds. (Cambridge University Press, 2012), pp. 1-68.

Diddams et al., "Molecular fingerprinting with the resolved modes of a femtosecond laser frequency comb," Nature 445, 627-630 (2007).

Donoho, "Compressed sensing," IEEE Trans. Inf. Theory 52, 1289-1306 (2006).

Duarte et al., "Single-pixel imaging via compressive sampling," Signal Processing Magazine, IEEE 25, 83-91 (2008).

Ei-Desouki et al., "CMOS image sensors for high speed applications," Sensors 9, 430-444 (2009).

Etoh et al., "Toward one giga frames per second-evolution of in situ storage image sensors," Sensors 13, 4640-4658 (2013).

Gao et al., "Single-shot compressed ultrafast photography at one hundred billion frames per second," Nature 516, 74-77 (2014).

* cited by examiner

COMPRESSIVE IMAGING SYSTEMS AND METHODS

CROSS-REFERENCE OF RELATED APPLICATION

This application claims priority to U.S. Provisional Application No. 62/113,215 filed Feb. 6, 2015, the entire content of which is hereby incorporated by reference.

This invention was made with U.S. Government support under grant number ECCS-1254610 awarded by the National Science Foundation (NSF). The U.S. Government has certain rights in the invention.

BACKGROUND

1. Technical Field

The field of the currently claimed embodiments of this invention relates to imaging systems, and more particularly to compressive imaging systems.

2. Discussion of Related Art

Ultrahigh-speed continuous imaging is a key enabling technology for investigations throughout the life and physical sciences. Though burst imaging systems such as CMOS and CCD imaging arrays with in situ storage are useful for observing isolated events, many applications (e.g. high-throughput diagnostics) necessitate continuous imagers, which require considerable hardware resources to record streams of high-speed image data. Architectures based on photonic time-stretch have made significant achievements in ultrahigh-speed continuous imaging. However, such approaches remain fundamentally limited in speed, resolution, and image quality by the measurement rate of electronic digitizers. Both conventional CCD arrays and photonic time-stretch enabled systems such as serial time-encoded amplified microscopy (STEAM) read out the pixel information serially with a single analog to digital converter (ADC), fixing the number of pixels acquired per second at the sampling rate of the ADC.

Real signals such as most natural images are highly compressible and contain far less information than their full bandwidth suggests, which has been demonstrated by the success of modern data compression algorithms such as JPEG and MPEG. Recent work applying the theory of compressed sensing (CS) indicates that, due to their compressibility, real signals can be acquired with far fewer measurements than conventionally deemed necessary. Thus cutting-edge ultrahigh-speed imaging systems are inefficient, collecting far more data than is required to accurately characterize the signals of interest and thus limiting their potential operating rate.

SUMMARY

According to some embodiments of the invention, a compressive imaging system includes an illumination system arranged to illuminate an object of interest with illumination light, and a detection system configured to detect at least a portion of the illumination light after being at least one of reflected from, scattered from, or transmitted through the object of interest or to detect fluorescent light from the object of interest and to provide an imaging signal. The compressive imaging system further includes an image processing system configured to communicate with the detection system so as to receive the imaging signal. The illumination light from the illumination system comprises a plurality of light pulses such that each light pulse has a preselected spectrum that is distinguishable from spectra of all other pulses of the plurality of light pulses. The image processing system is configured to form an image of the object of interest using information concerning the preselected spectra of the plurality of light pulses.

According to some embodiments of the invention, the illumination system includes a broadband pulsed light source configured to provide a plurality of illumination pulses, and a first dispersion component optically coupled with the broadband pulsed light source to receive the plurality of illumination pulses therefrom to provide a corresponding plurality of dispersed pulses, each having optical dispersion imparted thereto by the first dispersion component. The illumination system further includes an optical modulator arranged to modulate each pulse of the plurality of dispersed pulses to provide the preselected spectra such that each pulse is distinguishable from all other pulses of the plurality of light pulses. The illumination system further includes a second dispersion component arranged to receive each of the plurality of dispersed pulses after being modulated, the second dispersion component acting to substantially cancel dispersion imposed by the first dispersion component to provide a plurality of undispersed illumination pulses having mutually distinguishable spectra.

According to some embodiments of the invention, a compressive imaging method includes illuminating an object of interest with illumination light, and detecting at least a portion of the illumination light after being at least one of reflected from, scattered from, or transmitted through the object of interest or detecting fluorescent light from the object of interest and to provide an imaging signal. The method further includes processing the imaging signal to provide an image of the object of interest. The illumination light comprises a plurality of light pulses such that each light pulse has a preselected spectrum that is distinguishable from spectra of all other pulses of the plurality of light pulses, and the image processing system is configured to form an image of the object of interest using information concerning the preselected spectra of the plurality of light pulses.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The terms "light" and "optical" are intended to have a broad definition to include both visible and non-visible regions of the electromagnetic spectrum. For example, near infrared, infrared, and ultraviolet regions of the electromagnetic spectrum, in addition to visible light, are intended to be include within the definition of these terms.

Some embodiments of the current invention use chirped processing and electro-optic modulation in optical fiber components to encode unique pseudorandom binary patterns at an ultra-high rate onto the spectra of broadband mode-locked laser pulses. Each laser pulse receives a unique spectral pattern and then serves as an ultrashort burst of structured illumination of an object inside a 1- or 2-D spatial disperser. The output energy of each pulse after striking the object is recorded with a photodetector and digitizer and an image is reconstructed using Compressed Sensing recovery from only a few percent of the number of samples required for conventional Nyquist sampling.

Some embodiments of the current invention can achieve unique pseudorandom pattern rates >20,000× faster than previous imaging systems employing digital micromirror arrays to create structured illumination for Compressed Sensing imaging.

Figure 1:
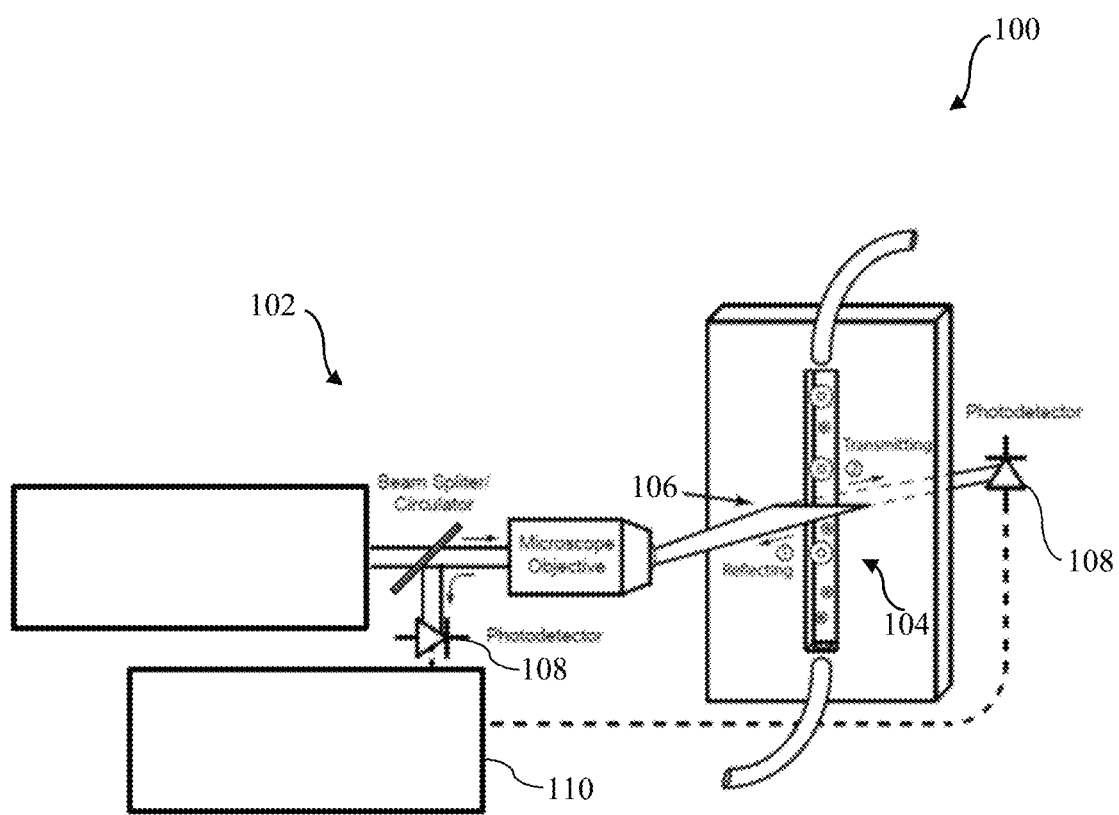
FIG. 1 is a schematic illustration of a compressive imaging system according to some embodiments of the invention.

A compressive imaging system according to some embodiments of the invention is shown in FIG. 1. The compressive imaging system 100 includes an illumination system 102 arranged to illuminate an object of interest 104 with illumination light 106. The compressive imaging system 100 also includes a detection system 108 configured to detect at least a portion of the illumination light after being at least one of reflected from, scattered from, or transmitted through the object of interest 104 or to detect fluorescent light from the object of interest 104 and to provide an imaging signal. The compressive imaging system 100 also includes an image processing system 110 configured to communicate with the detection system 108 so as to receive the imaging signal. The illumination light 106 from the illumination system 102 includes a plurality of light pulses such that each light pulse has a preselected spectrum that is distinguishable from spectra of all other pulses of the plurality of pulses. The image processing system 110 is configured to form an image of the object of interest 104 using information concerning the preselected spectra of the plurality of pulses.

Figure 2:
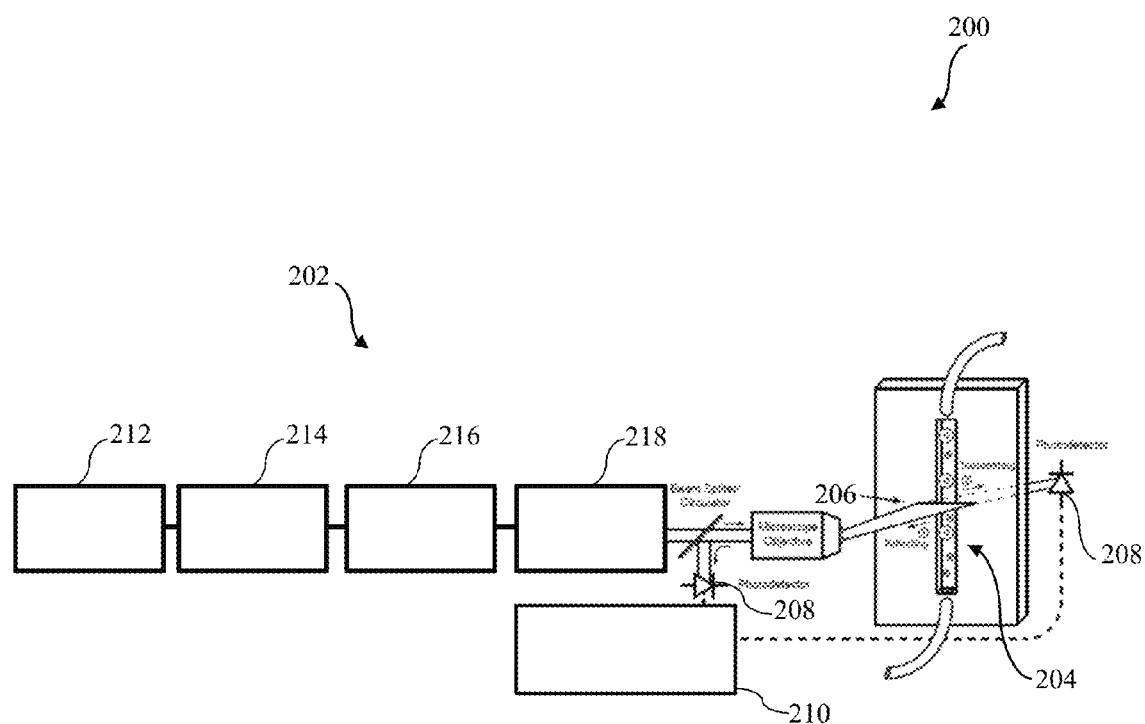
FIG. 2 is a schematic illustration of a compressive imaging system according to some additional embodiments of the invention.

A compressive imaging system according to some additional embodiments of the invention is shown in FIG. 2, wherein like reference numerals refer to like features. For example, reference numeral 202 refers to the illumination system, as does reference numeral 102 in FIG. 1. In addition to the features shown in FIG. 1, the compressive imaging system 200 according to some embodiments includes an illumination system 202 that includes broadband pulsed light source 212 configured to provide a plurality of illumination pulses, and a first dispersion component 214 optically coupled with the broadband pulsed light source 212 to receive the plurality of illumination pulses therefrom to provide a corresponding plurality of dispersed pulses, each having optical dispersion imparted thereto by the first dispersion component 214. The illumination system 202 further includes an optical modulator 216 arranged to modulate each pulse of the plurality of dispersed pulses to provide the preselected spectra such that each pulse is distinguishable from all other pulses of the plurality of pulses. The illumination system 202 further includes a second dispersion component 218 arranged to receive each of the plurality of pulses after being modulated, the second dispersion component 218 acting to substantially cancel dispersion imposed by the first dispersion component 214 to provide a plurality of undispersed illumination pulses having mutually distinguishable spectra.

According to some embodiments of the invention, the optical modulator has a switching time that is at least several times faster than a temporal length of the plurality of dispersed pulses. According to some embodiments, the optical modulator is configured to modulate each pulse of the plurality of dispersed pulses to provide the preselected spectra such that each pulse has a pseudo-random, binary spectral distribution. According to some embodiments, illumination system further includes a wavelength-to-space mapping diffraction grating arranged in an optical path between the broadband pulsed light source and the object of interest, and a lens system disposed between the wavelength-to-space mapping diffraction grating and the object of interest to focus diffracted light from the diffraction grating onto the object of interest.

According to some embodiments of the invention, the first and second dispersion components are optical fibers. According to some embodiments, the optical modulator is an electro-optic optical modulator. According to some embodiments, the electro-optic optical modulator is a Mach-Zehnder modulator. According to some embodiments, the detection system is a one-bit detection system.

According to some embodiments of the invention, the image processing system is configured to processes the imaging signal to form blocks of pixels, wherein the image processing system selects the blocks of pixels based on local image structures. According to some embodiments, the image processing system is configured to form the image of the object of interest using a global iterative recovery process, wherein the image includes a plurality of local regions, and wherein the global iterative recovery process optimizes each of the plurality of local regions to be sparse. According to some embodiments, the global iterative recovery process recovers a particular region of interest of the object of interest illuminated with illumination light.

Figure 3:
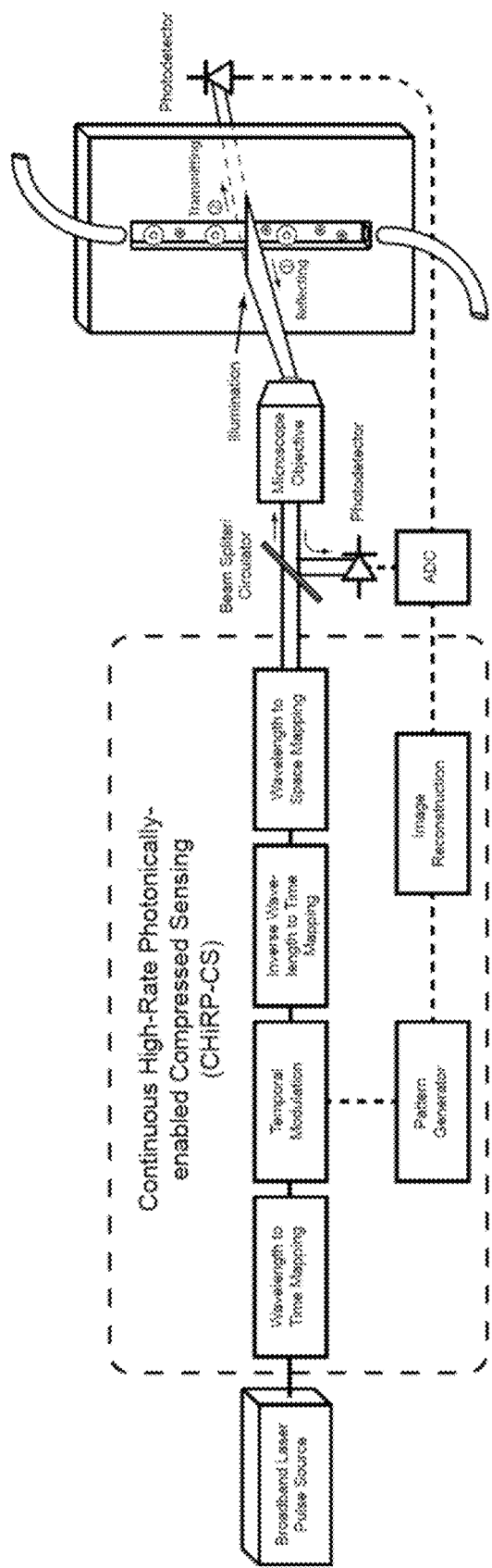
FIG. 3 shows an imaging flow cytometry system that includes a compressive imaging system according to some embodiments of the invention.

According to some embodiments of the invention, an imaging flow cytometry system includes a flow channel and a compressing imaging system according to any of the above-described embodiments. FIG. 3 shows an example of an imaging flow cytometry system that includes a compressive imaging system according to some embodiments of the current invention.

According to some embodiments of the invention, a compressive imaging method includes illuminating an object of interest with illumination light, and detecting at least a portion of the illumination light after being at least one of reflected from, scattered from, or transmitted through the object of interest or detecting fluorescent light from the object of interest and to provide an imaging signal. The method further includes processing the imaging signal to provide an image of the object of interest. The illumination light from the illumination system includes a plurality of light pulses such that each light pulse has a preselected spectrum that is distinguishable from spectra of all other pulses of the plurality of pulses, and the image processing system is configured to form an image of the object of interest using information concerning the preselected spectra of the plurality of pulses.

According to some embodiments, illuminating the object of interest with illumination light includes directing the illumination light at a plurality of regions of the object of interest. According to some embodiments, processing the image signal to provide an image of the object of interest includes using a global iterative recovery process, wherein the image includes a plurality of local regions, and wherein the global iterative recovery process optimizes each of the plurality of local regions to be sparse. According to some embodiments, the global iterative recovery process recovers a particular region of interest of the object of interest illuminated with illumination light.

Compared to previous spectrally-encoded imaging with broadband laser pulses and serial read-out (STEAM), images can be acquired with less than 10% of the previous data acquisition rate, better signal-to-noise ratio, and cheaper hardware.

In some embodiments, methods and software encoded based of the methods use patch-based image recovery algorithm relying on local sparsity of images can be adapted for single 1-D pseudorandom measurements acquired with an object flowing at constant speed in a determined direction.

The control protocol and algorithms described herein may be implemented by a processor. The processor may be referred to as an image processing system. The processor can be a dedicated "hard-wired" device, or it can be a programmable device. For example, it can be, but is not limited to, a personal computer, a work station, or any other suitable electronic device for the particular application. In some embodiments, it can be integrated into a unit or it can be attachable, remote, and/or distributed.

The following examples describe some embodiments in more detail. The broad concepts of the current invention are not intended to be limited to the particular examples. Further, concepts from each example are not limited to that example, but may be combined with other embodiments of the system.

EXAMPLES

Example 1

Compressive Ultrahigh-Speed Continuous Imaging Using Spectrally-Structured Ultrafast Laser Pulses Ultrahigh-speed continuous imaging is a key enabling technology for investigations throughout the life and physical sciences. [1-5] Though burst imaging systems such as CMOS [6] and CCD [7] imaging arrays with in situ storage are useful for observing isolated events, many applications (e.g. high-throughput diagnostics) necessitate continuous imagers, which require considerable hardware resources to record streams of high-speed image data. Architectures based on photonic time-stretch have made significant achievements in ultrahigh-speed continuous imaging. [8-13] However, such approaches remain fundamentally limited in speed, resolution, and image quality by the measurement rate of electronic digitizers. [14] Both conventional CCD arrays and photonic time-stretch enabled systems such as STEAM read out the pixel information serially with a single analog to digital converter (ADC), fixing the number of pixels acquired per second at the sampling rate of the ADC.

Real signals such as most natural images are highly compressible and contain far less information than their full bandwidth suggests, which has been demonstrated by the success of modern data compression algorithms such as JPEG and MPEG. [15, 16] Recent work applying the theory of compressed sensing (CS) indicates that, due to their compressibility, real signals can be acquired with far fewer measurements than conventionally deemed necessary. [17-21] Thus cutting-edge ultrahigh-speed imaging systems are inefficient, collecting far more data than is required to accurately characterize the signals of interest and thus limiting their potential operating rate.

Recently, data compression in the optical domain has become a popular topic of research to improve analog-todigital conversion efficiency. Several systems have been demonstrated for compressive photonic sampling of sparse RF signals. [22-26] In addition to compressive sampling, the anamorphic stretch transform (AST) has been proposed to achieve time-bandwidth compression of pulsed optical waveforms. [27, 28]

Here we demonstrate an ultrahigh-speed continuous imaging system that applies ultrahigh-rate spectral shaping of ultrafast laser pulses to CS image acquisition. Spectral shaping is achieved through chirp processing of broadband laser pulses to enable ultrafast structured illumination of objects flowing through a 1D field of view. We demonstrate the system's potential for imaging high speed flows by imaging complex test objects printed on transparencies and 25-μm polystyrene microsphere clusters, respectively, fixed to a spinning hard disk platter. Compressive measurements are acquired in a single shot at a rate of one digital sample per optical pulse. We demonstrate successful reconstruction of 2D images from the 1D compressive measurements at effective 1.45, 2.90, and 5.81 Gigapixel/sec rates from a 90 MHz sampling rate. We also extend the system with optical pulse interleaving to 19.8 and 39.6 Gigapixel/sec rates from a 720 MHz acquisition rate.

Compressed Sensing Imaging

Traditionally, signals are sampled according to the Nyquist theorem to acquire an initial digital representation and then a compression algorithm is applied, eliminating as much of the redundant information in the original data as possible. Modern compression algorithms such as JPEG and MPEG achieve this reduction via sparse approximation, transforming the original signal to an appropriate mathematical basis and saving only the most significant coefficients. Thus, most of the data that the sampling array and digitizer spend the energy to acquire is simply thrown away. For most applications in high-speed continuous imaging, there is room for a significant improvement in efficiency because the raw image data bandwidth is far larger than is truly necessary to represent the signal faithfully.

Compressed sensing is a new and influential sampling paradigm that attempts to build compression directly into the signal acquisition process while maintaining high fidelity. According to CS theory, a K-sparse signal $x^* \in \mathbb{R}^N$ is measured through a set of M measurements of linear projections $y_i = \langle \alpha_i, x^* \rangle$, $i=1, \ldots, M$, in which vectors $\alpha_i \in \mathbb{R}^N$ form the matrix A of size M×N. To reconstruct $x^*$, $l_1$-minimization is used to solve the problem $$\min_x \|x\|_1 \quad (1.1)$$
$$\text{s.t.}$$
$$\|y - Ax\|_2 \leq \sigma.$$

This deals with the case of imperfect observations contaminated by noise, i.e., $y = Ax^* + w$ where w is some unknown perturbation bounded by a known amount $\|w\|_2 \leq \sigma$. If the sensing matrix A obeys the Restricted Isometry Property (RIP) [17] and σ is not too large, then the solution $\hat{x}$ of (1.1) does not depart significantly from the optimal solution $x^*$, so long as the number of measurements M is on the order of K log N. [17-21] Thus the CS framework advocates the collection of significantly fewer measurements than the full dimension of the signal (M<<N).

The most representative application of CS to imaging is the single-pixel camera in which light collected from an object is randomly patterned by a digital micro-mirror device (DMD) before it is focused onto a single-pixel photodetector. [29, 30] By setting the micro-mirrors in the pixel array to reflect toward or away from the detector, the system creates pseudorandom 2D patterns to modulate the image before summing the optical power at the detector, effectively performing an optical inner product, $y_i = \langle \alpha_i, x^* \rangle$. However, even in the fastest single pixel cameras, the need to mechanically transition the MEMS-actuated micro-mirrors fixes the upper limit of the pattern rate at a few kHz, restricting the total image acquisition time. In contrast, the ultrahigh-rate spectral shaper demonstrated here achieves illumination pattern rates more than 20,000× faster, permitting the application of CS to the domain of ultrahigh-speed continuous imaging.

Experimental System

Optical System

Figure 4:
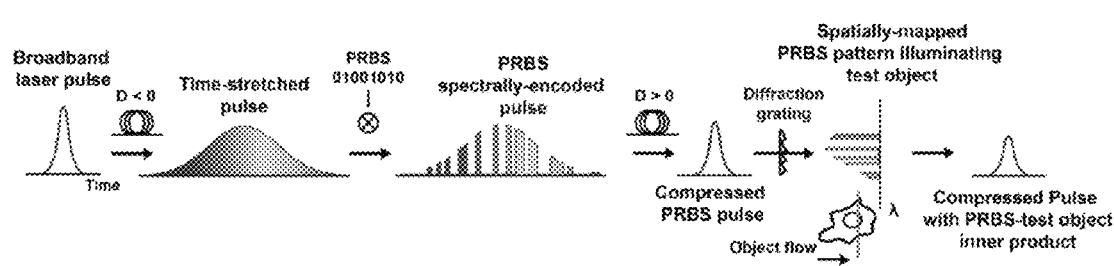
FIG. 4 illustrates the conceptual operation of the imaging system according to some embodiments.

According to some embodiments, the system presented here (FIGS. 4, 6A, and 6B) functions by modulating pseudorandom patterns at an ultrahigh rate onto the optical spectra of broadband mode-locked laser pulses and then employing these spectral patterns as structured illumination of an object. Light collected from the object is directed onto a single-pixel high-speed photodetector and the energy of each returned laser pulse is recorded continuously by a synchronized real-time ADC. A CS recovery algorithm constructs an image of the object from far fewer measurements than would be required for conventional Nyquist sampling.

Spectral patterning is accomplished using chirp processing in optical fiber. [24] A passively mode-locked erbium-doped fiber laser (MLL) emitting 300-fs pulses at the native 90-MHz repetition rate (centered at 1555 nm) is amplified with an erbium-doped fiber amplifier (EDFA) and input to a dispersive spectrum-to-time mapping in a dispersion compensating fiber (DCF). The high peak input power and moderate nonlinearity of the DCF permit spectral broadening to a full width of 33 nm. The large group velocity dispersion (GVD) of the DCF stretches the 300-fs MLL pulses to greater than 28 ns.

Each pulse is modulated with a unique ultrahigh-rate pseudorandom binary pattern and then re-compressed in fiber to an ultrashort duration before passing through a 1D wavelength-to-space mapping that focuses the spectral pattern onto the object plane, providing structured illumination of the object flow. According to some embodiments, pattern modulation is achieved with an 11.52-Gbit/s pulse pattern generator (PPG) synchronized to the MLL driving a 20-GHz Mach-Zehnder intensity modulator (MZM). This corresponds to 128 pseudorandom binary features per 11.1-ns pulse repetition period. The PPG continuously modulates a customized string of 1.1 Mbit or 8615 patterns, permitting uninterrupted video acquisition. A few patterns are used as a header to determine the alignment between the samples from the ADC and the predetermined pseudorandom patterns for the reconstruction, but the 95.7-μs repetition period for the set of patterns does not affect the robustness of the sampling approach.

After spectral patterning, the pulses are time-compressed in standard single-mode fiber (SMF) with complementary GVD and dispersion slope to the DCF. The spectrally-patterned and compressed laser pulses pass through a 1D spatial disperser to serve as ultrafast structured illumination of an object flow. We demonstrate this imaging system at two levels of magnification and therefore construct two different 1D spatial dispersers. The low magnification disperser is composed of a 600-line/mm ruled diffraction grating and 175-mm focal length spherical lens. The high magnification disperser employs the same grating with a 1-m focal length spherical lens to form an intermediate structured illumination image before a 200-mm tube lens and a 50× near-IR microscope objective (Olympus LCPLN50XIR, NA=0.65) designed for long working distance. According to some embodiments, the optics are specifically chosen to permit the spectral resolution of the diffraction grating to exceed the minimum feature size. To test the system under operating conditions safe for biological samples, we fix the optical power at 300 μW at the object plane.

Test objects pass through the focused image of the structured illumination and the scattered light returns through the disperser into an optical fiber and amplified 150-MHz photodetector. Thus, the system behaves as a confocal imager. As in prior work focusing on application to imaging flow cytometry, [9] the objects move through the system field of view at a constant velocity and 2D images are reconstructed with a vertical dimension that corresponds to both time and vertical spatial extent.

The detected pulse energy, recorded with a synchronized ADC, represents the vector inner product between the spatial features of the object and the unique spectral illumination pattern. Therefore, only one digital sample per pulse, acquired at the laser repetition rate, is required for each compressive measurement. To achieve the minimum electronic digitization rate for the greatest system sampling efficiency, an externally-clocked ADC is driven with a 90-MHz sampling clock derived from the MLL monitor port. The phase of the sampling clock is fixed to align the sampling windows with the peaks of the detected voltage waveform.

In the high magnification disperser, the tube lens and objective demagnify the structured illumination patterns to create 1.2-μm×1.2-μm features across a 390-μm 1D field of view. However, in practice, we add a low-power EDFA before the high magnification disperser to compensate the additional coupling loss into the microscope objective. Lower gain in the EDFA at the edges of the spectrum causes slight narrowing of the field of view to 332 μm with approximately 275 horizontal pixels (28-nm spectral width).

Figure 6A:
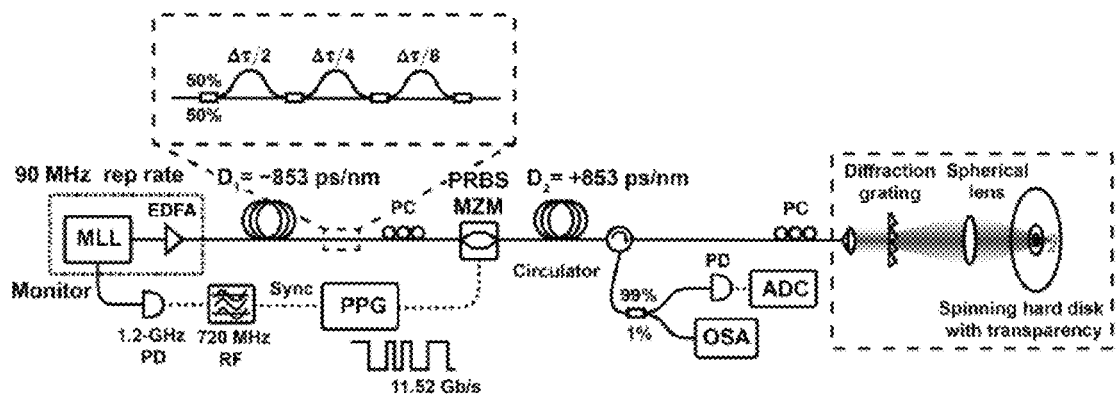
FIG. 6A shows a detailed system schematic including a pulse interleaver (left-side dashed box) for the results shown in FIG. 7.
Figure 6B:
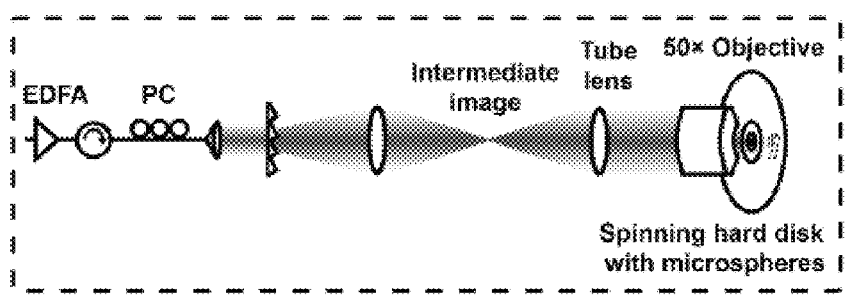
FIG. 6B shows the spatial disburser and microscope that replaced the features shown in the right-side dashed box of FIG. 6A to acquire the results shown in FIGS. 8 and 9.

To investigate higher acquisition rates for very high-speed flows observed with the high-magnification system, we also add three time-interleaving fiber Mach-Zehnder interferometers after the time-stretching fiber to increase the pulse repetition rate to 720 MHz (FIG. 6A, left-side dashed box). To accommodate the new pulse repetition rate, we also switch to a 1.2-GHz PD and 720-MHz ADC sampling rate.

Reconstruction Algorithm

To reconstruct the 2D image frames from the 1D compressive pseudorandom measurements, we develop a novel 2D reconstruction algorithm tailored to this imaging system. Similar to conventional image compression such as JPEG, the reconstruction framework focuses on the local image structures: we utilize $l_1$ minimization coupled with a discrete cosine transform (DCT) basis at the local level of blocks of pixels called patches. Any selected local patch should be sparse; out of all candidate images that are consistent with the 1D measurements, the iterative optimization algorithm seeks the most sparse set of overlapped patches. Given a patch or block of pixels $x \in \mathbb{R}^{N_b \times M_b}$ extracted at random location from an image, the coefficient $\alpha \in \mathbb{R}^{N_b \times M_b}$ of $x$ under some sparsifying transform $\tilde{\Psi}(\cdot)$ defined by $\alpha = \tilde{\Psi}(x)$ should be sparse or compressible.

The recovery process estimates the set of sparse coefficients $\{\alpha^k\}_{k=1}^P$ of the patch set $\{x^k\}_{k=1}^P$ covering the entire image of interest which is consistent with the 1D observations. Denoting $\{\overline{\alpha}^k\}_{k=1}^P$ as the sparse coefficients of the patches $\{\overline{x}^k\}_{k=1}^P$ extracted from the original image $\overline{G} \in \mathbb{R}^{N \times M}$ and given the set of measurement vectors and sensing matrices $\{(y_j, \Phi_j)\}_{j=1}^M$ we obtain the sparse coefficients from the optimization problem $$\min_{\{\alpha_k\}} \sum_{k=1}^P \|\alpha^k\|_1 \qquad (1.2)$$

s.t.

$$\Phi_j[P(\{\Psi(\alpha^k)\}_{k=1}^P)]_j = y_j,$$

$$\forall j \in 1, \ldots, M.$$

Here $\Psi(\cdot)$ is the inverse sparsifying transform of $\tilde{\Psi}(\cdot)$ satisfying $\overline{x}^k = \Psi(\overline{\alpha}^k)$, $\forall k=1, \ldots, p$; $P(\cdot)$ is the operator that combines the set of image patches $\{\overline{x}^k\}_{k=1}^P$ back to the original image, i.e., $\overline{G} = P(\{\Psi(\overline{\alpha}^k)\}_{k=1}^P)$; $\Phi_j \in \mathbb{R}^{m \times N}$, $\forall j=1, \ldots, M$ is the local pseudorandom sensing matrix used to measure row $\overline{g}_j$ of $\overline{G}$ and $y_j$ is the corresponding measurement vector.

The optimization (1.2) can be solved efficiently by an iteratively alternating minimization procedure. At iteration t of the algorithm, a noisy estimate $G_t$ of the original image consistent with the observations is reconstructed based on the information from the previous iteration. The estimates of the coefficients $\{\alpha_t^k\}_{k=1}^P$ at this iteration can then be found by thresholding the coefficients of the noisy patches $\{x_t^k\}_{k=1}^P$ extracted from $G_t$.

Imaging Constraints

The number of features per optical pulse (N) is set by the total dispersion ($D_1$), spectral width ($\Delta\lambda$), and pattern modulation rate ($R_{PRBS}$):

$$N = |D_1|\Delta\lambda R_{PRBS}. \qquad (1.3)$$

For the system parameters employed here ($D_1 = -853$ ps/nm, 11.52 Gbit/s modulation rate, and $\Delta\lambda = 33$ nm), we achieve 323 features per pulse within the full spectral bandwidth, which sets the horizontal pixel resolution of the reconstructed images.

The chirp processing technique employed to create the spectral structured illumination patterns imposes a limit on the achievable number of pseudorandom features per pulse. Each feature modulated by the PPG fits into a bit slot of duration $\delta t$ and because each feature creates new frequency components in a bandwidth of approximately $\delta t^{-1}$, the bandwidth of the chirped optical carrier within the time span must exceed $\delta t^{-1}$ for the feature to be modulated without distortion. The condition can be written as [31]

$$\delta t^2 \geq 2\pi|\beta_2 z|. \qquad (1.4)$$

For the chirping parameters employed here, $\delta t = 86.8$ ps and $\sqrt{2\pi|\beta_2 z|} = 82.7$ ps. Thus, the number of pattern features achieved is approximately at the limit for the available spectral bandwidth $\Delta\lambda$. Increasing the dispersion or the pattern modulation rate would only result in decreased modulation depth for the fastest (e.g., 010 or 101) alternating features. However, by exceeding the requirement in (1.4), it is possible to achieve >15 dB modulation depth for all features across the full spectral width [24] to approach ideal binary patterns with an envelope corresponding to the spectral shape.

Figure 5:
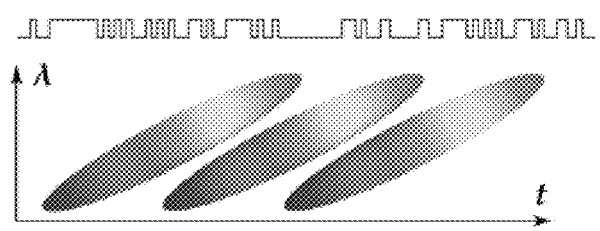
FIG. 5 illustrates the temporal overlap of the pulses at the pattern modulation stage according to some embodiments of the invention.

As depicted in FIG. 5, the time-stretched pulses overlap partially during pattern modulation. Thus, neighboring pulses share some temporal features, but these features are mapped to different wavelengths and involve different regions of the structured illumination pattern. This preserves mutual incoherence between the pseudorandom patterns while permitting many more features per pulse. Each feature occupies a spectral bandwidth of 12.5 GHz, which corresponds to a shutter speed of 35.2 ps for a transform-limited Gaussian feature inside the disperser.

Because we acquire compressive 1D pseudorandom line scans with a horizontal resolution set by the pulse spectral width and chirp processing parameters, the recovered vertical dimension $N_v$ can be used as a tuning parameter depending on the complexity of the objects under test. In the reconstruction process, we use an effective $M_l$ samples per line, far fewer than the number of pixels per line $N_l$ where the full dimension $N=N_l \times N_v$. Thus, the compression ratio, line rate, and pixel rate are related to the average number of samples needed to reconstruct each line in the image by $$\text{Compression ratio} = \frac{M_l}{N_l},$$

$$\text{Line rate} = \frac{f_s}{M_l},$$

and $$\text{Pixel rate} = f_s \frac{N_l}{M_l}$$

where $f_s$ is the pulse repetition rate and ADC sampling rate. Because the pixel rate of conventional systems is directly determined by the maximum usable ADC sampling rate, we refer to this primarily as the system figure of merit.

Experimental Results

Low Magnification

To test the system's performance imaging complex flowing objects moving at high speed, we construct a test using laser-printed transparencies fixed to the platter of a modified 7200 RPM spinning hard disk. The printed patterns are located at the outer edge of the platter and measured to be moving at 34.3 m/s. Thus, they provide customizable test objects of varying complexity with features on the scale of 100 μm for low magnification high speed flow imaging.

Figure 7:
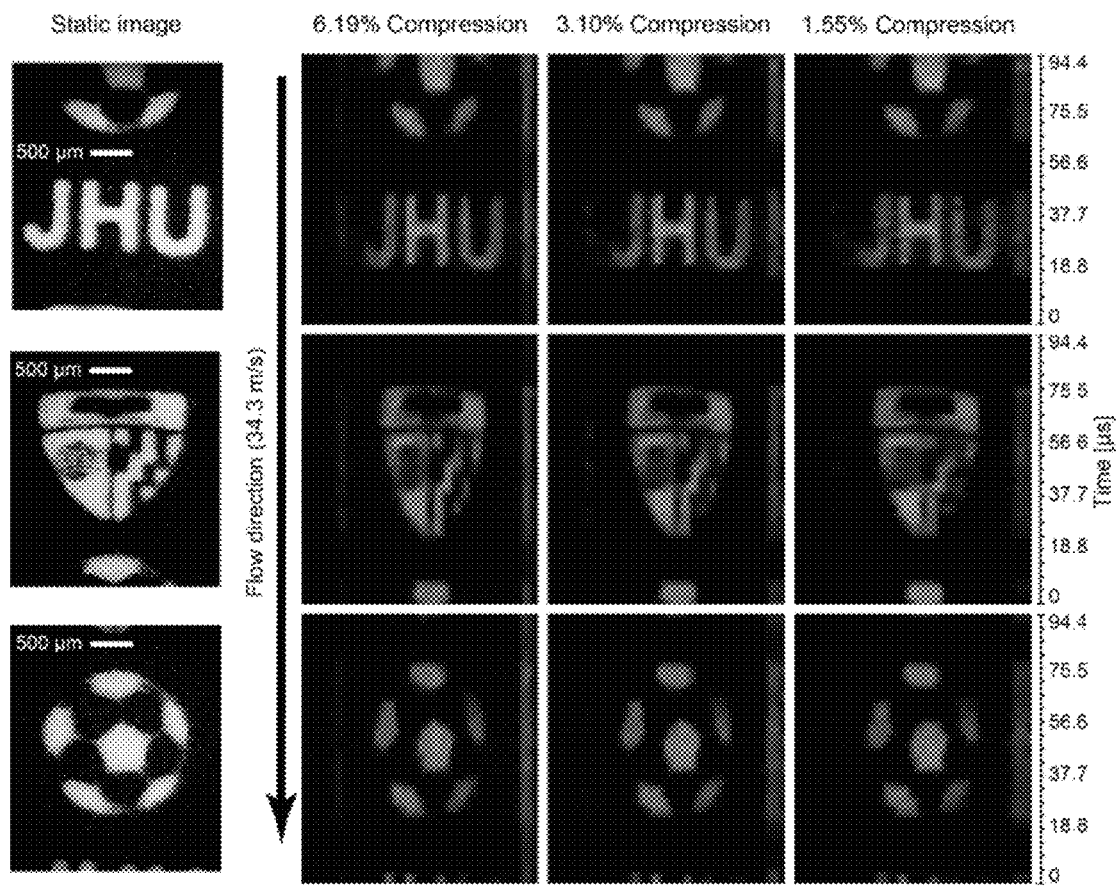
FIG. 7 shows images of a laser-printed transparency with three objects of varying complexity that was fixed to the top platter of a 7200-RPM computer hard drive and imaged by the system described herein at compression ratios of 6.19, 3.10, and 1.55%.

Reconstructions of three different test patterns are depicted in FIG. 7 at compression ratios of 6.19, 3.10, and 1.55%. Static images acquired with a separate visible light microscope appear in the first column and the succeeding columns correspond to reconstructions at decreasing compression ratios. All of the images are reconstructed from 8500 measurements, acquired in a single shot in 94.4 μs. The unevenness in the illumination is due to the spectral envelope, which was left un-compensated in these results. We demonstrate successful imaging of complex objects flowing at high speed under low magnification at effective 1.45, 2.90, and 5.81 Gigapixel/sec rates from a 90 MHz sampling rate.

High Magnification

To demonstrate the system performance imaging micronscale objects flowing at high speed, we construct a second test with 25-μm undyed polystyrene microspheres dried onto the surface of the hard disk platter. Images of two clusters of microspheres are acquired at the native 90 MHz (FIG. 8) and interleaved 720 MHz (FIG. 9) sampling rates using the extended system depicted in FIGS. 6A and 6B. The hard disk motor is driven by a brushless DC motor controller to investigate multiple flow speeds.

Figure 8:
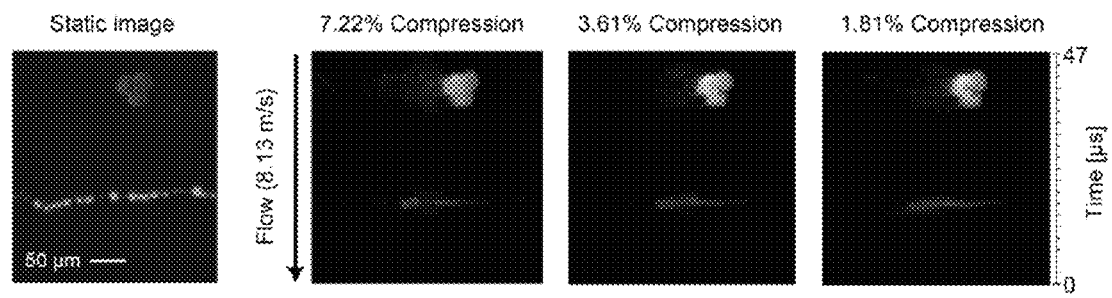
FIG. 8 shows a single cluster of 25-μm polystyrene microspheres and a line of amorphous particles imaged by the system described herein while moving at 8.13 m/s, reconstructed at compression ratios of 7.22, 3.61, and 1.81%.

FIG. 8 depicts a single cluster of three microspheres and a line of amorphous solid particles imaged moving at 8.13 m/s and reconstructed at 7.22, 3.61, and 1.81% of Nyquist sampling using 4250 measurements. The outer shape of the cluster shows reasonable agreement at all three compression ratios, but there is some horizontal blurring most noticeable within the line of particles at 1.81% compression. Fall-off in the reconstructed image brightness corresponds to the reduced optical power toward the edges of the spectrum.

Figure 9:
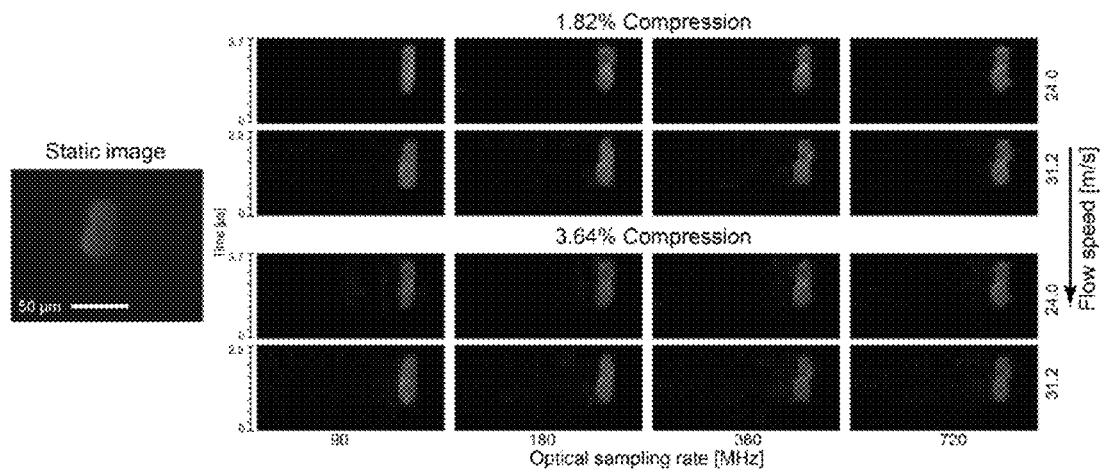
FIG. 9 shows a single cluster of 25-μm microspheres imaged by the system illustrated in FIG. 6A with the extension shown in FIG. 6B, wherein the cluster is moving at 24.0 and 31.2 m/s.

FIG. 9 depicts a single cluster of two microspheres imaged in two acquisitions moving at 24.0 and 31.2 m/s and reconstructed at compression ratios of 3.64 and 1.82% from 2678 measurements (24.0 m/s case) and 2038 measurements (31.2 m/s case) respectively. Both acquisitions were acquired at the interleaved 720 MHz sampling rate and then downsampled to 360, 180, and 90 MHz rates to demonstrate the benefit of the increased sampling rate for very high speed flows. At the 720 MHz sampling rate, the shape of the reconstructed cluster shows excellent agreement with the static reference image at both compression ratios. Moving to lower sampling rates, horizontal distortion especially at the intersection between the two microspheres becomes much more pronounced.

Because the static images included for reference in FIGS. 8 and 9 were acquired with a separate visible light microscope using dark field illumination, there is some uncertainty in how the microspheres and amorphous particles should ideally appear under the system's near-IR confocal illumination.

Compression Ratio

Figure 10:
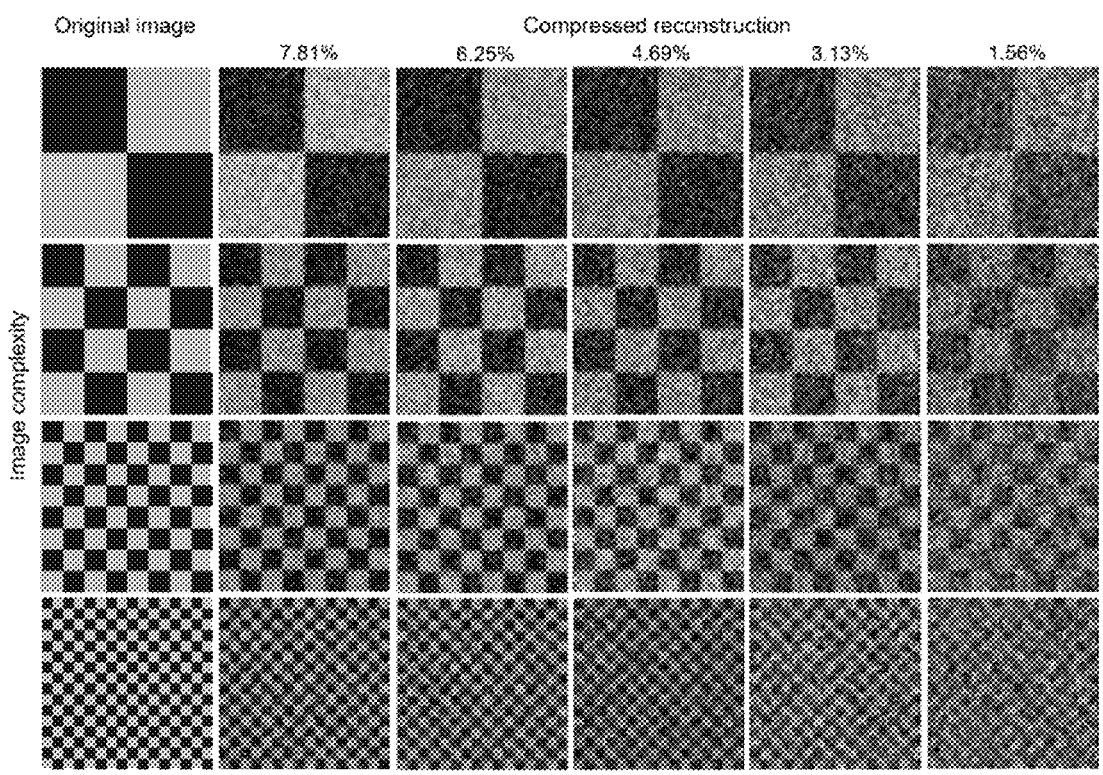
FIG. 10 shows reconstructions of simulated test patterns of increasing complexity used to judge the loss of resolution incurred at low compression ratios.
Figure 11:
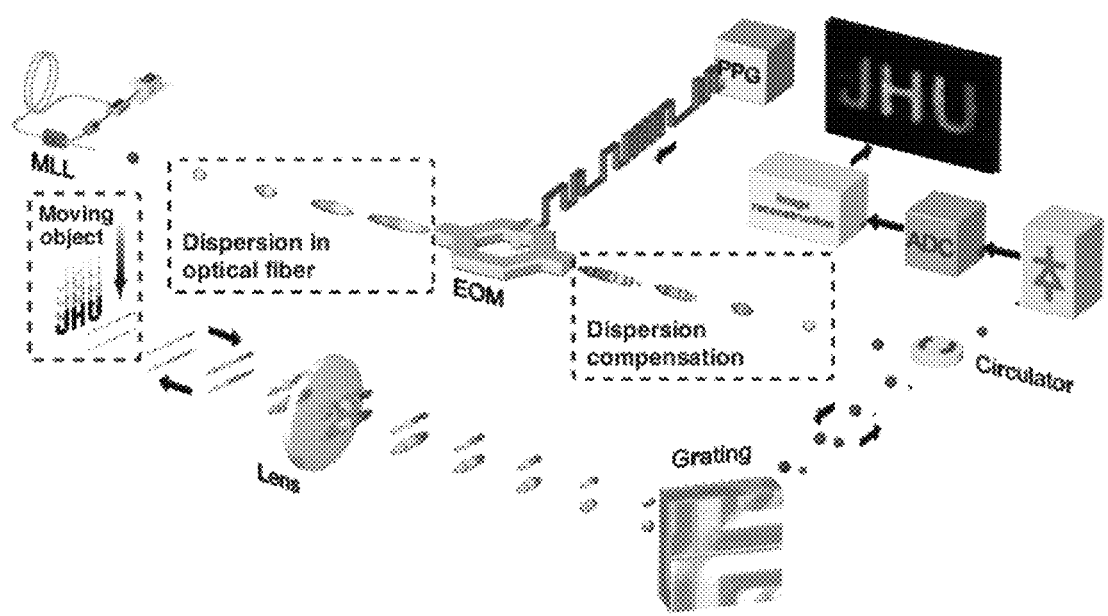
FIG. 11 illustrates how broadband laser pulses are dispersed in optical fiber to accomplish spectrum-to-time mapping.

To study further the effect of the compression ratio applied during the image reconstruction process, we construct a simulation test with static checkerboard test patterns of increasing complexity, i.e., increasing number of edges between light and dark regions (FIG. 10). Each row of FIG. 10 corresponds to a single density of the pattern. The full 320×320 pixel dimension of the original images is reconstructed from 25, 20, 15, 10, and 5 pseudorandom measurements per line, respectively, corresponding to 7.81, 6.25, 4.69, 3.13, and 1.56% of the number of measurements required for Nyquist sampling.

Moving across the columns toward higher compression ratios, the edges of the pattern become noticeably distorted by the noise in the reconstruction. At the smallest compression ratio, the least complex test patterns, particularly the top two rows, are easily discerned, but the most complex patterns are nearly lost. We refer to this as a static test because each line of the image is sampled a fixed number of times, excluding motion blur from sampling during the inter-line changes. For moving objects, lower compression ratios enable the detection of very fast phenomena that permit only a few samples before their disappearance, but there is an inherent trade-off in decreased horizontal resolution (FIGS. 8 and 9).

The test patterns are unlike the isolated objects with highly variable shape for which the system is intended, but they provide verification of the minimum compression ratios that can reasonably be employed and the expected noise and resolution of hard object edges. Additional salt and pepper noise, which is generally not present but appears for patterns like the checkerboard, can be removed trivially with a 3 pixel median filter (not applied in FIG. 10).

Discussion

The system presented here successfully extends CS imaging to acquisition of very high speed phenomena. Compressive pseudorandom structured illumination reduces the required sampling bandwidth and information storage capacity by increasing the information content gained per digital sample. Rather than encoding each line of the image onto a single laser pulse and digitizing at many times the pulse rate to acquire the horizontal pixel information as in a time-stretch imager, we employ a higher pulse repetition rate and sample each pulse only once. The pseudorandom measurements coupled with CS recovery permit both real-time efficient image compression and much higher output signal to noise ratio, eliminating the requirement for very high gain (25-30 dB [8, 9]) optical amplification to raise the output signal above the noise floor of the detector and ADC. Beyond imaging of flows, the system can be readily adapted using a 2D spatial disperser [32] to 3D compressive video measurements [33] of ultrahigh-speed phenomena.

References—Example 1

[1] Petty, H. R., "Spatiotemporal chemical dynamics in living cells: from information trafficking to cell physiology," Biosystems 83(23), 217-224 (2006).

[2] Lang, P., Yeow, K., Nichols, A., and Scheer, A., "Cellular imaging in drug discovery," Nat. Rev. Drug Discov. 5(4), 343-356 (2006).

[3] Brouzes, E., Medkova, M., Savenelli, N., Marran, D., Twardowski, M., Hutchison, J. B., Rothberg, J. M., Link, D. R., Perrimon, N., and Samuels, M. L., "Droplet microfluidic technology for single-cell high-throughput screening," Proc. Natl. Acad. Sci. U.S.A. 106(34), 14195-14200 (2009).

[4] Rimon, N. and Schuldiner, M., "Getting the whole picture: combining throughput with content in microscopy," J. Cell Sci. 124(22), 3743-3751 (2011).

[5] Weaver, W. M., Tseng, P., Kunze, A., Masaeli, M., Chung, A. J., Dudani, J. S., Kittur, H., Kulkarni, R. P., and Carlo, D. D., "Advances in high-throughput single-cell microtechnologies," Curr. Opin. Biotechnol. 25(0), 114-123 (2014).

[6] El-Desouki, M., Jamal Deen, M., Fang, Q., Liu, L., Tse, F., and Armstrong, D., "CMOS image sensors for high speed applications," Sensors 9(1), 430-444 (2009).

[7] Etoh, T. G., Son, D. V., Yamada, T., and Charbon, E., "Toward one giga frames per second—evolution of in situ storage image sensors," Sensors 13(4), 4640-4658 (2013).

[8] Goda, K., Tsia, K., and Jalali, B., "Serial time-encoded amplified imaging for real-time observation of fast dynamic phenomena," Nature 458(7242), 1145-1149 (2009).

[9] Goda, K., Ayazi, A., Gossett, D. R., Sadasivam, J., Lonappan, C. K., Sollier, E., Fard, A. M., Hur, S. C., Adam, J., Murray, C., Wang, C., Brackbill, N., Di Carlo, D., and Jalali, B., "High-throughput single-microparticle imaging flow analyzer," Proc. Natl. Acad. Sci. U.S.A. (2012).

[10] Wong, T. T. W., Lau, A. K. S., Wong, K. K. Y., and Tsia, K. K., "Optical time-stretch confocal microscopy at 1 μm," Opt. Lett. 37(16), 3330-3332 (2012).

[11] Wong, T. T. W., Lau, A. K. S., Ho, K. K. Y., Tang, M. Y. H., Robles, J. D. F., Wei, X., Chan, A. C. S., Tang, A. H. L., Lam, E. Y., Wong, K. K. Y., Chan, G. C. F., Shum, H. C., and Tsia, K. K., "Asymmetric-detection time-stretch optical microscopy (ATOM) for ultrafast high-contrast cellular imaging in flow," Sci. Rep. 4 (2014).

[12] Xing, F., Chen, H., Lei, C., Weng, Z., Chen, M., Yang, S., and Xie, S., "Serial wavelength division 1 GHz line-scan microscopic imaging," Photon. Res. 2(4), B31-B34 (2014).

[13] Chen, H., Lei, C., Xing, F., Weng, Z., Chen, M., Yang, S., and Xie, S., "Multiwavelength time-stretch imaging system," Opt. Lett. 39(7), 2202-2205 (2014).

[14] Azeredo-Leme, C., "Clock jitter effects on sampling: A tutorial," IEEE Circuits Syst. Mag. 11(3), 26-37 (2011).

[15] Marcellin, M. W., [JPEG2000: Image Compression Fundamentals, Standards, and Practice], Springer, N.Y. (2002).

[16] Mallat, S., [A Wavelet Tour of Signal Processing: The Sparse Way], Academic, Burlington, Mass. (2008).

[17] Candès, E. J. and Tao, T., "Decoding by linear programming," IEEE Trans. Inf. Theory 51(12), 4203-4215 (2005).

[18] Candès, E. J., Romberg, J., and Tao, T., "Robust uncertainty principles: Exact signal reconstruction from highly incomplete frequency information," IEEE Trans. Inf. Theory 52(2), 489-509 (2006).

[19] Donoho, D. L., "Compressed sensing," IEEE Trans. Inf. Theory 52(4), 1289-1306 (2006).

[20] Candès, E. J. and Wakin, M. B., "An introduction to compressive sampling," IEEE Signal Process. Mag. 25(2), 21-30 (2008).

[21] Baraniuk, R. G., "Compressive sensing," IEEE Signal Process. Mag. 24(4), 118-124 (2007).

[22] Nichols, J. M. and Bucholtz, F., "Beating nyquist with light: a compressively sampled photonic link," Opt. Express 19(8), 7339-7348 (2011).

[23] Valley, G. C., Sefler, G. A., and Shaw, T. J., "Compressive sensing of sparse radio frequency signals using optical mixing," Opt. Lett. 37(22), 4675-4677 (2012).

[24] Bosworth, B. T. and Foster, M. A., "High-speed ultrawideband photonically enabled compressed sensing of sparse radio frequency signals," Opt. Lett. 38(22), 4892-4895 (2013).

[25] Liang, Y., Chen, M., Chen, H., Lei, C., Li, P., and Xie, S., "Photonic-assisted multi-channel compressive sampling based on effective time delay pattern," Opt. Express 21(22), 25700-25707 (2013).

[26] Chen, Y., Yu, X., Chi, H., Jin, X., Zhang, X., Zheng, S., and Galili, M., "Compressive sensing in a photonic link with optical integration," Opt. Lett. 39(8), 2222-2224 (2014).

[27] Asghari, M. H. and Jalali, B., "Anamorphic transformation and its application to time-bandwidth compression," Appl. Opt. 52(27), 6735-6743 (2013).

[28] Asghari, M. H. and Jalali, B., "Experimental demonstration of optical real-time data compression," Appl. Phys. Lett. 104(11) (2014).

[29] Takhar, D., Laska, J. N., Wakin, M. B., Duarte, M. F., Baron, D., Sarvotham, S., Kelly, K. F., and Baraniuk, R. G., "A new compressive imaging camera architecture using optical-domain compression," in [Computational Imaging IV], Bouman, C. A., Miller, E. L., and Pollak, I., eds., Proc. SPIE 6065,606509 (2006).

[30] Studer, V., Bobin, J., Chahid, M., Mousavi, H. S., Candès, E., and Dahan, M., "Compressive fluorescence microscopy for biological and hyperspectral imaging," Proc. Natl. Acad. Sci. U.S.A. 109(26), E1679-E1687 (2012).

[31] Weiner, A., [Ultrafast optics], John Wiley & Sons, Hoboken, N.J. (2011).

[32] Diddams, S. A., Hollberg, L., and Mbele, V., "Molecular fingerprinting with the resolved modes of a femtosecond laser frequency comb," Nature 445(7128), 627-630 (2007).

[33] Yang, J., Yuan, X., Liao, X., Llull, P., Brady, D., Sapiro, G., and Carin, L., "Video compressive sensing using gaussian mixture models," IEEE Trans. Image Process. 23(11), 4863-4878 (2014).

Example 2

High-Speed Flow Microscopy Using Compressed Sensing with Ultrafast Laser Pulses

Ultrahigh-speed continuous imaging is a critical technology for high-throughput screening of cell structure and behavior [1], drug discovery [2, 3], rare cell detection for cancer diagnostics [4], and numerous other clinical and basic research applications throughout the life and physical sciences [5, 6]. For example, understanding cellular heterogeneity has become essential for investigating drug resistance in cancer treatment wherein cells of interest often comprise less than 0.2% of the total population [6]. Identification and isolation of subpopulations presents a significant challenge for statistically and biologically meaningful analysis and thus demands techniques capable of both high throughput and high information content. To meet this requirement, imaging flow cytometry combines the high acquisition rate of non-imaging traditional flow cytometry with the high information content of optical microscopy [7]. However, while traditional flow cytometry can analyze samples at flow velocities in the range of 10 m/s, imaging flow cytometers remain limited by the image acquisition step to maximum flow velocities of 0.06 m/s [8]. Photonic systems such as time-stretch microscopy [9-13] are poised to close this gap, permitting analysis at flow velocities up to 10 m/s [11] and thus drastically reducing the time to detect rare events such as circulating tumor cells with an incidence of one in several million [4].

High-speed imagers generally fall into two categories: burst sampling and continuous sampling. Using in situ storage, cutting-edge complementary metal-oxide semiconductor (CMOS) [14] and charge-coupled device (CCD) [15] imaging arrays have achieved impressive burst frame rates of 10s of MHz. [16] However, these architectures offer maximum record lengths limited by pixel-level memory constraints to approximately 100 frames. Microscopic imaging up to a 4.4 THz frame rate for 6 frames has been demonstrated in a technique called sequentially timed all-optical mapping photography (STAMP), using spectrally-carved mode-locked laser pulses spatially separated on an imaging array using a diffraction grating. [17] Burst imaging of macroscale objects at up to 100 GHz frame rates for up to 350 frames using a digital micromirror device (DMD) and streak camera in conjunction with compressed sensing (CS) recovery has also been recently demonstrated in a technique named compressed ultrafast photography (CUP). [18] The STAMP and CUP burst sampling systems achieve incredible burst pixel rates of 1.66 exapixels/sec and 2.25 petapixels/sec, however these sampling rates can only be sustained for time spans of 1.37 ps and 3.5 ns respectively, followed by dead times of at least 1-10 ms for the required image sensor readout.

While burst sampling systems are useful for observing extremely fast but isolated events in a single-shot, many applications (e.g. high-throughput diagnostics) necessitate continuous sampling, which requires tremendous hardware resources to record the massive stream of high-speed image data. Recently, cutting-edge imaging architectures employing ultrafast laser pulses and fiber-optic-based information processing yielded a performance leap in ultrahigh-speed continuous acquisition. [9-13] Still, such approaches remain fundamentally limited in speed, resolution, and image quality by the measurement rate of electronic digitizers. [19] For example, both traditional CCD arrays and state-of-the-art photonic systems such as serial time-encoded amplified microscopy (STEAM) read out the pixel information serially with a single analog to digital converter (ADC). Thus the number of pixels acquired per second is equal to the sampling rate of the ADC.

Notably, real signals such as most natural images are highly compressible and contain far less information than their full capacity as evidenced by the prevalence of modern data compression technology. Moreover, a recent advance in signal acquisition theory known as compressed sensing indicates that, due to their compressibility, real signals can be acquired with far fewer measurements than conventionally deemed necessary. [20-24] Thus cutting-edge ultrahigh-speed imaging systems are inefficient, collecting far more data than is required to accurately characterize the signals of interest and thus limiting their potential operating rate.

Recently, data compression in the optical domain has become a popular topic of research to improve analog-to-digital conversion efficiency. Several systems have been demonstrated for compressive photonic sampling of sparse radio frequency (RF) signals. [25-29] Beyond permitting signal characterization with a sub-Nyquist number of measurements, compression in the optical domain has also enabled extension of the effective sampling bandwidth beyond the electronic subsystem limitations [26, 27] and temporal integration of the pseudorandom measurements to allow for low ADC sampling rates. [27, 29] In addition to compressive sampling, the anamorphic stretch transform (AST) has been proposed to achieve time-bandwidth compression of pulsed optical waveforms by employing sublinear group delay chirping in conjunction with measurement of the complex electric field. [30, 31] Very recently, multiple groups have also shown interest in compressed sensing imaging using ultrafast pulses, [32-35] but to our knowledge this paper is the first demonstration of ultrafast structured illumination imaging of microscopic objects moving at high speed.

Here we demonstrate an imaging system that harnesses continuous high-rate photonically-enabled compressed sensing (CHiRP-CS) for image acquisition. In the CHiRP-CS imaging approach, ultrahigh-rate spectral shaping is achieved through dispersive chirp processing of broadband laser pulses to enable ultrafast structured illumination of objects flowing through a one-dimensional (1D) field of view. We investigate two different 1D spatial dispersers for low and high magnification imaging of complex test objects printed on transparencies and 25-μm polystyrene microsphere clusters, respectively, placed on a spinning hard disk platter. Compressive measurements are acquired continuously without averaging at a rate of one digital sample per optical pulse. We demonstrate successful reconstruction of 2D images from the 1D compressive measurements at effective 1.46, 4.19, and 7.32-Gigapixel/sec rates from a 90-MHz sampling rate. We also extend the system with optical pulse interleaving to 9.9, 19.8 and 39.6-Gigapixel/sec rates from a 720-MHz acquisition rate.

Compressed Sensing Theory and Application to Imaging

Real images and most real-world signals are highly compressible and can be accurately represented by relatively few significant coefficients in an appropriate mathematical basis. Sparse approximation—the process of transforming the signal to this basis and saving the most significant coefficients while ignoring the rest—is the foundation of modern data compression technologies such as the Joint Photographic Experts Group (JPEG) and Moving Picture Experts Group (MPEG) formats. [36, 37] Traditionally a signal is sampled according to the Nyquist theorem to acquire a raw digital representation and then a compression algorithm is applied, eliminating as much of the redundancy in the original data as possible. Hence, most of the acquired data is simply thrown away. Consequently, for most applications in high-speed continuous acquisition, the raw image data bandwidth is far larger than is truly necessary.

Compressed sensing is a recent and influential sampling paradigm that advocates a more efficient signal acquisition process. According to CS theory, a K-sparse signal $x^* \in \mathbb{R}^n$ is measured through a set of M measurements of linear projections $y_i = \langle a_i, x^* \rangle$, $i=1, \ldots, M$, in which vectors $a_i \in \mathbb{R}^N$ form the matrix A of size M×N. To reconstruct $x^*$, $l_1$-minimization is used to solve the following problem $$\min_x \|x\|_1 \quad (2.1)$$

s.t.

$$\|y - Ax\|_2 \leq \sigma.$$

The case above deals with imperfect observations contaminated by noise, i.e., $y = Ax^* + w$ where w is some unknown perturbation bounded by a known amount $\|w\|_2 \leq \sigma$. If the sensing matrix A obeys the Restricted Isometry Property (RIP) [20] and σ0 is not too large, then the solution $\hat{x}$ of Eq. (2.1) does not depart significantly from the optimal solution $x^*$, so long as the number of measurements M is on the order of K log N. [20-24] Thus the CS framework advocates the collection of significantly fewer measurements than the ambient dimension of the signal (M<<N).

A notable CS imaging architecture is the single-pixel camera in which light collected from an object is randomly combined via a digital micro-mirror device (DMD) before it is focused onto a single-pixel photodetector. [38] By tuning each micro-mirror in the pixel array, the system creates pseudorandom 2D patterns that modulate the image before summing the optical power using the single detector, thereby optically performing the inner product, $y_i = \langle a_i, x^* \rangle$. This technique has also been extended to macroscopic [39] and microscopic structured illumination imaging. [40] However, in all of these systems the need to mechanically transition the MEMS-actuated micro-mirrors sets the upper limit of the pattern rate to a few kHz, restricting the total image acquisition time. In contrast, the CHiRP-CS architecture we demonstrate here achieves illumination pattern rates more than 20,000× faster. Thus our approach allows for application of CS to the domain of ultrahigh-speed image acquisition.

Experimental System

According to some embodiments of the invention, a principle of operation of the CHiRP-CS imaging system (FIGS. 5, 6A, 6B, and 11) is to modulate pseudorandom patterns at an ultrahigh rate onto the optical spectra of broadband mode-locked laser pulses and then utilize these spectral patterns to create structured illumination of an object. Light collected from the object is directed onto a single-pixel high-speed photodetector and the energy of each returned laser pulse is recorded continuously by a synchronized real-time ADC. A CS recovery algorithm then constructs an image of the object from far fewer measurements than would be required for conventional Nyquist sampling.

According to some embodiments of the invention, each pulse is modulated with a unique ultrahigh-rate pseudorandom binary pattern and then re-compressed in fiber (Dispersion compensation) to an ultrashort duration before passing through a 1D wavelength-to-space mapping diffraction grating and lens that focuses the spectral pattern onto the object plane, providing structured illumination of the object flow. The output pulse energy traveling back through the spatial disperser to the photodiode and ADC represents an optically-computed inner product between the pseudorandom pattern and the object. The image is reconstructed via a sparsity-driven optimization from sub-Nyquist compressive measurements.

Spectral patterning is accomplished using chirp processing in optical fiber. [27] A passively mode-locked erbium-doped fiber laser (MLL) emitting 300-fs pulses at the native 90-MHz repetition rate (centered at 1555 nm) is used in conjunction with a C-band erbium-doped fiber amplifier (EDFA) to amplify the optical pulse train to 200 mW. Dispersive spectrum-to-time mapping is then performed in a dispersion compensating fiber (DCF) with a total group velocity dispersion (GVD) of −853 ps/nm and dispersion slope of −2.92 ps/nm$^2$ at 1550 nm. Spectral broadening to a full width of 33 nm is achieved through the high peak power after the EDFA and the moderate nonlinearity ($\gamma = 7.6$ W$^{-1}$km$^{-1}$) of the DCF, stretching the 300-fs MLL pulses to greater than 28 ns.

Pattern modulation is achieved with an 11.52-Gbit/s pulse pattern generator (PPG) synchronized to the MLL driving a 20-GHz Mach-Zehnder intensity modulator (MZM). This permits 128 pseudorandom binary features per 11.1-ns pulse repetition period. The PPG can output user-programmable patterns up to 1.3 Mbit in length; in practice a customized string of 1.1 Mbit or 8615 patterns is used. Of these, a few patterns are used as a header to determine the alignment between the samples from the ADC and the predetermined pseudorandom patterns for the reconstruction. The PPG modulates the set of patterns continuously permitting uninterrupted sampling and the 95.7-μs repetition period for the set of patterns does not affect the robustness of the sampling approach.

Figure 12:
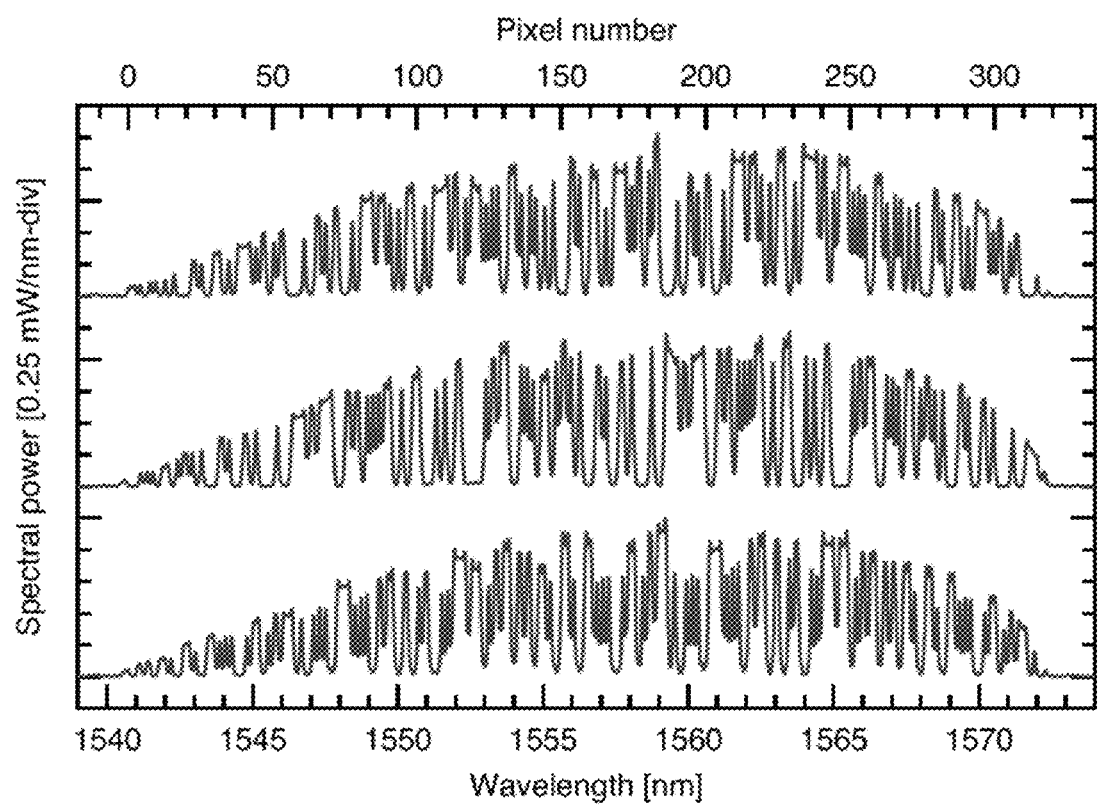
FIG. 12 shows example repeating 128-bit pseudorandom binary patterns observed with an optical spectrum analyzer.

As depicted in FIG. 5, the time-stretched pulses overlap partially during pattern modulation. Thus, neighboring pulses share some temporal features, but these features are mapped to different wavelengths and, thereby, involve different regions of the structured illumination pattern. This preserves mutual incoherence between the pseudorandom patterns while permitting many more features per pulse. Three example PRBS-encoded laser pulse spectra are shown in FIG. 12. In practice, we achieve 325 features per pulse within the spectral bandwidth, which sets the horizontal pixel resolution of the reconstructed images. Actual sampling patterns are unique to each pulse and cannot be observed on the averaged spectrum.

After spectral patterning, the pulses are time-compressed in standard single-mode fiber (SMF) with complementary GVD of +853 ps/nm and dispersion slope of +2.92 ps/nm$^2$ at 1550 nm to the DCF. The spectrally-patterned and compressed laser pulses pass through a 1D spatial disperser to serve as ultrafast structured illumination of an object flow.

Here we demonstrate the CHiRP-CS imaging system at two levels of magnification and therefore we construct two different 1D spatial dispersers. The low magnification disperser is composed of a 600-line/mm ruled diffraction grating and 123-mm effective focal length spherical lens. The high magnification disperser employs the same grating with a 1-m focal length spherical lens to form an intermediate structured illumination image before a 200-mm tube lens and a 50× near-IR microscope objective (Olympus LCPLN50XIR, NA=0.65) designed for long working distance. Large-area high-resolution optics are specifically chosen to allow the spectral resolution of the diffraction grating to exceed the minimum feature size. To test the system under operating conditions safe for biological samples, we fix the optical power at 300 μW at the object plane.

Each feature occupies a spectral bandwidth of 12.5 GHz, which corresponds to a shutter speed of 35.2 ps for a transform-limited Gaussian feature inside the disperser. The decreased modulation depth for the fastest (e.g., 010 or 101) alternating features (FIG. 12) is a product of the single feature bandwidth and the pattern modulation rate. By adjusting the pattern modulation rate, it is possible to achieve >15 dB modulation depth for all features across the full spectral width [27] to approach ideal binary patterns with an envelope corresponding to the spectral shape.

Test objects pass through the focused image of the structured illumination and the scattered light returns through the disperser into an optical fiber and amplified 150-MHz photodetector. Thus, the system behaves as a confocal imager. As in prior work focusing on application to imaging flow cytometry [4], the objects move through the system field of view at a constant velocity and 2D images are reconstructed with a vertical dimension that corresponds to both time and vertical spatial extent.

The detected pulse energy, recorded with a synchronized ADC, represents the vector inner product between the spatial profile of the object and the unique spectral illumination pattern. Therefore, only one digital sample per pulse, acquired at the laser repetition rate, is required for each compressive measurement. To achieve the minimum electronic digitization rate for the greatest system sampling efficiency, an externally-clocked ADC is driven with a 90-MHz sampling clock derived from the MLL monitor port input to a 1.2-GHz photodiode with appropriate RF band-pass filters. The phase of the sampling clock is fixed to align the sampling windows with the peaks of the detected voltage waveform.

The low magnification disperser produces a 2.77-mm×5.4-μm structured illumination line with 8.5-μm×5.4-μm features at the object plane. In the high magnification disperser, the tube lens and objective (designed for 180-mm tube length) result in a 55.6×demagnification of the structured illumination patterns to create 1.2-μm×1.2-μm features across a 390-μm 1D field of view. However, in practice, we add a low-power EDFA before the high magnification disperser to compensate the additional coupling loss into the microscope objective. Lower gain in the EDFA at the edges of the spectrum causes slight narrowing of the field of view to 330 μm with 275 horizontal pixels (28-nm spectral width).

Finally, to investigate even higher acquisition rates in the high-magnification system, we also add three time-interleaving fiber Mach-Zehnder interferometers after the time-stretching fiber, before the PRBS MZM to increase the pulse repetition rate to 720 MHz (left-side dashed box in FIG. 6A). To accommodate the new pulse repetition rate, we also switch to a 1.2-GHz PD and 720-MHz ADC sampling rate.

Reconstruction Algorithm

Figure 13:
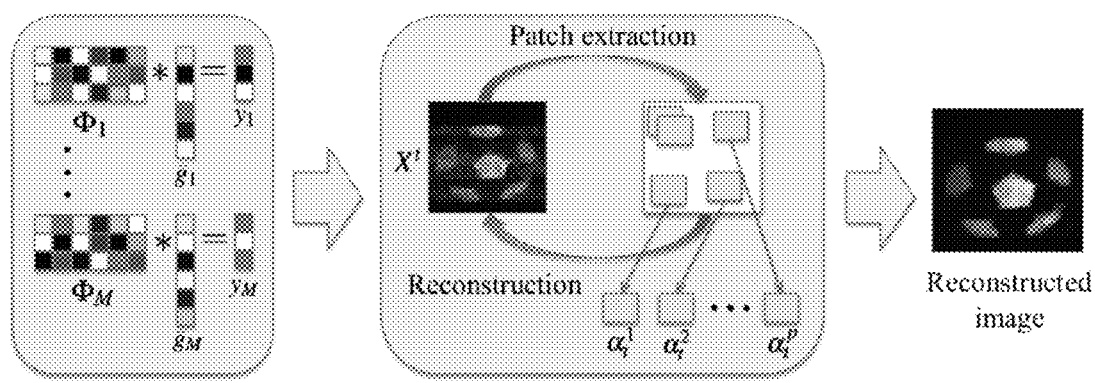
FIG. 13 is a schematic illustration of patch based image recovery from 1D compressive pseudorandom measurements, which iterates between two steps—global reconstruction of the image estimates and maximizing the sparsity level of all local image patches.

To reconstruct the 2D image frames from the 1D compressive pseudorandom measurements, a naïve approach is to recover one image row at a time independently. Instead, we further develop a novel 2D reconstruction algorithm tailored to this imaging apparatus. As depicted in FIG. 13, we utilize $l_1$-minimization coupled with a discrete cosine transform (DCT) basis at the local level of blocks of pixels called patches: any selected local patch should be sparse. Out of all candidate images that are consistent with the 1D measurements, the iterative optimization algorithm seeks the most sparse set of overlapped patches.

Similar to conventional image compression such as JPEG, the reconstruction framework focuses on the local image structures. A popular model to quantify local image information is sparsity in an appropriate domain: given a patch or block of pixels $x \in \mathbb{R}^{N_b \times M_b}$ extracted at random location from an image, the coefficient $\alpha \in \mathbb{R}^{N_b \times M_b}$ of x under some sparsifying transform $\tilde{\Psi}(\cdot)$ defined by $\alpha = \tilde{\Psi}(x)$ should be sparse or compressible.

The recovery process estimates the set of sparse coefficients $\{\alpha^k\}_{k=1}^P$ of the patch set $\{x^k\}_{k=1}^P$ covering the entire image of interest which is consistent with the 1D observations. Denoting $\{\overline{\alpha}^k\}_{k=1}^P$ as the sparse coefficients of the patches $\{\overline{x}^k\}_{k=1}^P$ extracted from the original image $\overline{G} \in \mathbb{R}^{N \times M}$, the 1D compressive measurement process can be written as $$y_j = \Phi_j[P(\{\Psi(\overline{\alpha}^k)\}_{k=1}^P)]_j = y_j, \forall j \in 1, \ldots, M$$

where $\Psi(\cdot)$ is the inverse sparsifying transform of $\tilde{\Psi}(\cdot)$ satisfying $\overline{x}^k = \Psi(\overline{\alpha}^k)$, $\forall k=1, \ldots, p$; $P(\cdot)$ is the operator that combines the set of image patches $\{\overline{x}^k\}_{k=1}^P$ back to the original image, i.e., $\overline{G} = P(\{\Psi(\overline{\alpha}^k)\}_{k=1}^P)$; $\Phi_j \in \mathbb{R}^{m \times N}$, $\forall j=1, \ldots, M$ is the local pseudorandom sensing matrix used to measure row $\overline{g}_j$ of $\overline{G}$ and $y_j$ is the corresponding measurement vector. Given the set of measurement vectors and sensing matrices $\{(y_j, \Phi_j)\}_{j=1}^M$, obtain the sparse coefficients from the following optimization problem $$\min_{\{\alpha_k\}} \sum_{k=1}^P \|\alpha^k\|_1 \qquad (2.2)$$

s.t.

$$\Phi_j[P(\{\Psi(\alpha^k)\}_{k=1}^p)]_j = y_j,$$

$$\forall j \in 1, \ldots, M.$$

The optimization problem in Eq. (2.2) can be solved efficiently by an iteratively alternating minimization procedure. At iteration t of the algorithm, a noisy estimate $G_t$ of the original image consistent with the observations is reconstructed based on the information from the previous iteration. The estimates of the coefficients $\{\alpha_t^k\}_{k=1}^P$ at this iteration can then be found by thresholding the coefficients of the noisy patches $\{x_t^k\}_{k=1}^P$ extracted from $G_t$.

Because we acquire compressive 1D pseudorandom line scans with a horizontal resolution set by the pulse spectral width and chirp processing parameters, the recovered vertical dimension $N_v$ can be used as a tuning parameter depending on the complexity of the objects under test. In the reconstruction process, we use an effective $M_l$ samples per line, far fewer than the number of pixels per line $N_l$ where the full dimension $N=N_l \times N_v$. Thus, the compression ratio, line rate, and pixel rate are related to the average number of samples needed to reconstruct each line in the image by $$\text{Compression ratio} = \frac{M_l}{N_l},$$

$$\text{Line rate} = \frac{f_s}{M_l},$$

and $$\text{Pixel rate} = f_s \frac{N_l}{M_l}$$

where $f_s$ is the pulse repetition rate and ADC sampling rate. Because the pixel rate of conventional systems is directly determined by the maximum usable ADC sampling rate, we refer to this primarily as the system figure of merit.

Experimental Results

Low Magnification

We construct a high-speed test image using laser-printed transparencies fixed to the platter of a dismantled 7200-RPM (rotations per minute) hard drive. The printed test objects are positioned on the outer edge of the spinning platter, measured to be moving at 34.3 m/s. The transparencies offer complex customized test objects with microscale features to measure the system performance at low magnification.

Figure 14:
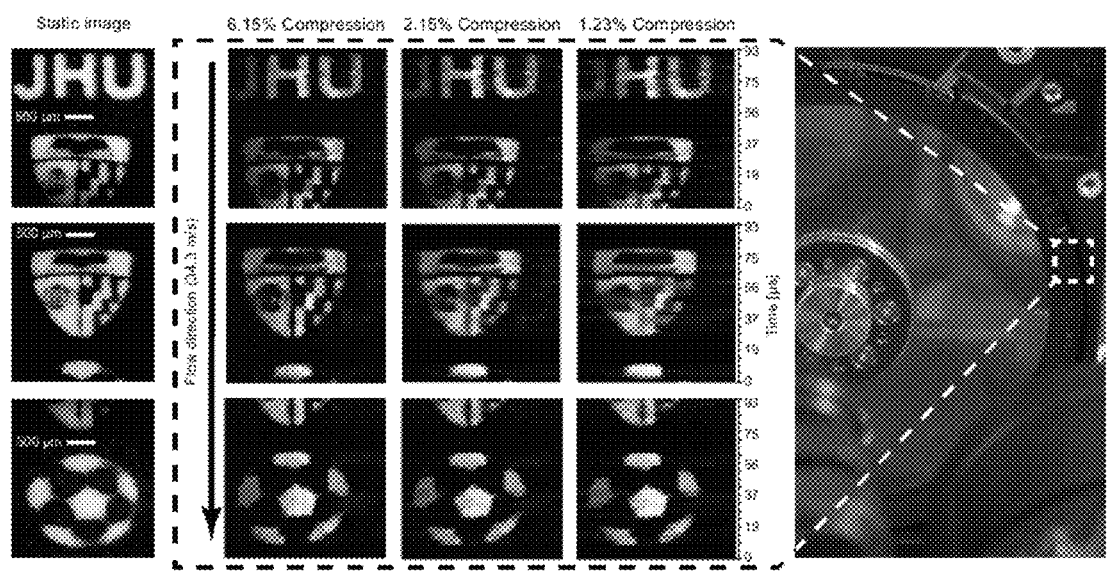
FIG. 14 shows images of a laser-printed transparency with three objects of varying complexity that was fixed to the top platter of a 7200-RPM computer hard drive (also shown) and imaged by the system described herein at compression ratios of 6.15, 2.15, and 1.23%.

Our reconstructed results in FIG. 14 demonstrate imaging of complex objects moving at high speed from far fewer measurements than required in conventional Nyquist sampling. The first column shows optical microscope images of the static test objects for the purpose of comparison. Each subsequent column shows images of the objects moving at high speed taken with our compressive imager. Each of these images is reconstructed from 8400 consecutive measurements acquired in a single shot in 93.3 µs. Each column shows image reconstruction using a different relative percentage of measurements to recover the full image dimension. Therefore, the 6.15, 2.15, and 1.23% compression ratios in FIG. 14 correspond to imaging rates of 1.46, 4.19, and 7.32 Gigapixel/sec, which vastly exceed the present 90-MHz sampling rate.

The compression ratio is practically limited by the complexity of the object's spatial features. For example, simpler objects such as the soccer ball in the third row of FIG. 14 show very little loss of image quality as the compression ratio decreases whereas more complex objects such as the shield in the second row become noticeably distorted in the horizontal dimension. The unevenness in the illumination is due to the spectral envelope (FIG. 12), which was left un-compensated in these results.

High Magnification

Figure 15:
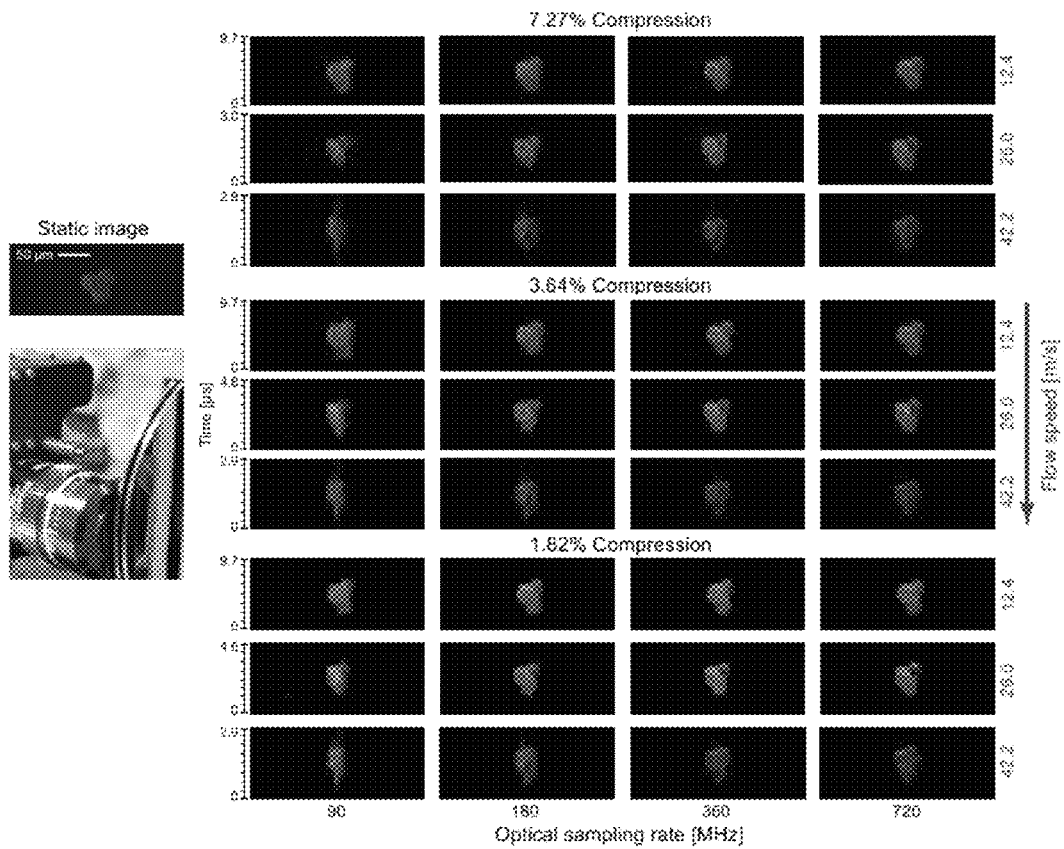
FIG. 15 shows a single cluster of 25-μm polystyrene microspheres and a line of amorphous particles imaged by the system described herein while moving at 12.4, 26.0, and 42.2 m/s, reconstructed at compression ratios of 7.22, 3.64, and 1.82%.

To demonstrate the CHiRP-CS system's potential for high-speed imaging of micron-scale objects (FIG. 6B) with correspondingly reduced signal contrast, we acquire images of a cluster of 25-µm undyed polystyrene microspheres dried onto the surface of the platter; the hard disk motor is now driven by a variable DC brushless motor controller. FIG. 15 depicts reconstructions of the cluster moving at 12.4, 26.0, and 42.2 m/s from 7000, 3350, and 2140 measurements respectively at measurement rates from 90-MHz up to the interleaved 720-MHz using 7.27, 3.64, and 1.82% of Nyquist sampling. Note, each row of the figure corresponds to a single acquisition at 720 MHz and downsampled versions at 360, 180, and 90 MHz in order to demonstrate the benefit of the increased optical sampling rate for high-speed flows. At 12.4 m/s, the shape of the microsphere cluster is well-represented at all sampling rates and compression ratios, but with some distortion at 90 MHz. There is also some characteristic horizontal blurring within the cluster at the higher compression ratio. At 42.2 m/s, though the reconstructed image contrast is reduced, the cluster shape shows excellent agreement in the 720 MHz case, but there is significant motion distortion that increases with lower sampling rate. At 1.82% compression, the loss of horizontal resolution at very low compression ratios prevents differentiation of the particles, but the overall size and shape of the cluster are well reconstructed. These results demonstrate image reconstruction of very high-speed microscopic flows at effective 9.9, 19.8 and 39.6 Gigapixel/sec rates from a maximum 720 MHz acquisition rate. To our knowledge these measurements are of the fastest flow rates to date for a diffraction limited microscopic line scan imager. [11]

To reconstruct the microspheres as bright objects on a dark background, we acquire a reference trace on the ADC with no objects inside the field of view and compute a difference signal with objects in the field of view and input this into the reconstruction. The static image included for reference in FIG. 15 was acquired with a separate visible light microscope using dark field illumination. Thus, there is some uncertainty in how the interior regions of the microspheres should ideally appear under the system's near-IR confocal illumination.

Discussion

In addition to data compression, the compressive sampling technique presented here also results in considerable benefits for the signal to noise ratio of the measurements. On average, half of a pulse's spectral features are given a high '1' intensity level and half will be given a low '0' level. Thus the output pulse energy per sample is proportional to half of the unmodulated pulse energy. On the contrary, for conventional systems the energy per sample is inversely proportional to the total number of pixels. For example, in STEAM, considerable optical amplification (25-30 dB) is required to raise the optical signal above the detection noise floor. [4, 9] While the CHiRP-CS approach demonstrated here is entirely compatible with optical amplification of the output signal, it was not necessary for the results presented here.

The system presented here successfully extends CS imaging to continuous ultrahigh sampling rates. Compressive pseudorandom structured illumination reduces the required sampling bandwidth and information storage capacity by shifting signal processing complexity to the image reconstruction process. Thus, for the proposed high throughput flow cytometry application, online processing can be employed to exclude empty frames, but offline processing will be required to complete the image reconstruction and analysis, similar to commercial imaging flow cytometers [7]. The system offers a benefit nonetheless by increasing the achievable image acquisition speeds and by achieving real-time efficient image compression. More test samples can thus be analyzed by the imaging apparatus in less time with more efficient data storage. Image post-analysis can be completed with inexpensive, readily available, and increasingly powerful computing hardware.

Compressive sampling opens a path to significantly higher speeds by increasing the information content gained per digital sample. For conventional Nyquist-sampling systems, the most efficient mode of operation is to acquire one sample per output image pixel. Typically, each image line is encoded on a single laser pulse and each pulse is sampled a number of times corresponding to the number of pixels per line. In contrast, we operate with a higher pulse repetition rate and each pulse is sampled once corresponding to a single compressive measurement. We demonstrate high-speed imaging using a smaller number of measurements corresponding to only a few percent of the total number of image pixels. In other words, at the same ADC sampling rate, this compressive system can perform 10-100× faster. In addition, because the system relies on structured illumination with straightforward single-pixel output photodetection, it can be readily adapted for imaging of fluorescence. Beyond imaging of flows, by employing a 2D spatial disperser, [41] the system can be readily adapted to 3D compressive video measurements [42] of ultrahigh-speed phenomena. Furthermore, this all-optical approach to compressive measurements can increase dramatically the speed and efficiency of multiple optical measurement modalities, for example, real-time spectroscopy, [43] swept-source optical coherence tomography, [44] and high-speed microwave measurement. [26,27,45]

References—Example 2

[1] H. R. Petty, "Spatiotemporal chemical dynamics in living cells: from information trafficking to cell physiology," Biosystems 83, 217-224 (2006).

[2] P. Lang, K. Yeow, A. Nichols, and A. Scheer, "Cellular imaging in drug discovery," Nat. Rev. Drug Discov. 5, 343-356 (2006).

[3] E. Brouzes, M. Medkova, N. Savenelli, D. Marran, M. Twardowski, J. B. Hutchison, J. M. Rothberg, D. R. Link, N. Perrimon, and M. L. Samuels, "Droplet microfluidic technology for single-cell high-throughput screening," Proc. Natl. Acad. Sci. U.S.A. 106, 14195-14200 (2009).

[4] K. Goda, A. Ayazi, D. R. Gossett, J. Sadasivam, C. K. Lonappan, E. Sollier, A. M. Fard, S. C. Hur, J. Adam, C. Murray, C. Wang, N. Brackbill, D. Di Carlo, and B. Jalali, "High-throughput single-microparticle imaging flow analyzer," Proc. Natl. Acad. Sci. U.S.A. (2012).

[5] N. Rimon and M. Schuldiner, "Getting the whole picture: combining throughput with content in microscopy," J. Cell Sci. 124, 3743-3751 (2011).

[6] W. M. Weaver, P. Tseng, A. Kunze, M. Masaeli, A. J. Chung, J. S. Dudani, H. Kittur, R. P. Kulkarni, and D. D. Carlo, "Advances in high-throughput single-cell microtechnologies," Curr. Opin. Biotechnol. 25, 114-123 (2014).

[7] D. A. Basiji, W. E. Ortyn, L. Liang, V. Venkatachalam, and P. Morrissey, "Cellular image analysis and imaging by flow cytometry," Clin. Lab. Med. 27, 653-670 (2007).

[8] Amnis Corporation, INSPIRE ImageStreamX System Software User's Manual, 4th ed. (2010).

[9] K. Goda, K. Tsia, and B. Jalali, "Serial time-encoded amplified imaging for real-time observation of fast dynamic phenomena," Nature 458, 1145-1149 (2009).

[10] T. T. W. Wong, A. K. S. Lau, K. K. Y. Wong, and K. K. Tsia, "Optical time-stretch confocal microscopy at 1 μm," Opt. Lett. 37, 3330-3332 (2012).

[11] T. T. W. Wong, A. K. S. Lau, K. K. Y. Ho, M. Y. H. Tang, J. D. F. Robles, X. Wei, A. C. S. Chan, A. H. L. Tang, E. Y. Lam, K. K. Y. Wong, G. C. F. Chan, H. C. Shum, and K. K. Tsia, "Asymmetric-detection time-stretch optical microscopy (ATOM) for ultrafast high-contrast cellular imaging in flow," Sci. Rep. 4 (2014).

[12] F. Xing, H. Chen, C. Lei, Z. Weng, M. Chen, S. Yang, and S. Xie, "Serial wavelength division 1 GHz line-scan microscopic imaging," Photon. Res. 2, B31-B34 (2014).

[13] H. Chen, C. Lei, F. Xing, Z. Weng, M. Chen, S. Yang, and S. Xie, "Multiwavelength time-stretch imaging system," Opt. Lett. 39, 2202-2205 (2014).

[14] M. El-Desouki, M. Jamal Deen, Q. Fang, L. Liu, F. Tse, and D. Armstrong, "CMOS image sensors for high speed applications," Sensors 9, 430-444 (2009).

[15] T. G. Etoh, D. V. Son, T. Yamada, and E. Charbon, "Toward one giga frames per second—evolution of in situ storage image sensors," Sensors 13, 4640-4658 (2013).

[16] T. Arai, J. Yonai, T. Hayashida, H. Ohtake, H. van Kuijk, and T. G. Etoh, "Back-side-illuminated image sensor with burst capturing speed of 5.2 Tpixel per second," in Sensors, Cameras, and Systems for Industrial and Scientific Applications XIV, R. Widenhorn and A. Dupret, eds., Proc. SPIE 8659, 865904 (2013).

[17] K. Nakagawa, A. Iwasaki, Y. Oishi, R. Horisaki, A. Tsukamoto, A. Nakamura, K. Hirosawa, H. Liao, T. Ushida, K. Goda, F. Kannari, and I. Sakuma, "Sequentially timed all-optical mapping photography (STAMP)," Nature Photon. 8, 695-700 (2014).

[18] L. Gao, J. Liang, C. Li, and L. V. Wang, "Single-shot compressed ultrafast photography at one hundred billion frames per second," Nature 516, 74-77 (2014).

[19] C. Azeredo-Leme, "Clock jitter effects on sampling: A tutorial," IEEE Circuits Syst. Mag. 11, 26-37 (2011).

[20] E. J. Candès and T. Tao, "Decoding by linear programming," IEEE Trans. Inf. Theory 51, 4203-4215 (2005).

[21] E. J. Candès, J. Romberg, and T. Tao, "Robust uncertainty principles: Exact signal reconstruction from highly incomplete frequency information," IEEE Trans. Inf. Theory 52, 489-509 (2006).

[22] D. L. Donoho, "Compressed sensing," IEEE Trans. Inf. Theory 52, 1289-1306 (2006).

[23] E. J. Candès and M. B. Wakin, "An introduction to compressive sampling," IEEE Signal Process. Mag. 25, 21-30 (2008).

[24] R. G. Baraniuk, "Compressive sensing," IEEE Signal Process. Mag. 24, 118-124 (2007).

[25] J. M. Nichols and F. Bucholtz, "Beating nyquist with light: a compressively sampled photonic link," Opt. Express 19, 7339-7348 (2011).

[26] G. C. Valley, G. A. Sefler, and T. J. Shaw, "Compressive sensing of sparse radio frequency signals using optical mixing," Opt. Lett. 37, 4675-4677 (2012).

[27] B. T. Bosworth and M. A. Foster, "High-speed ultrawideband photonically enabled compressed sensing of sparse radio frequency signals," Opt. Lett. 38, 4892-4895 (2013).

[28] Y. Liang, M. Chen, H. Chen, C. Lei, P. Li, and S. Xie, "Photonic-assisted multi-channel compressive sampling based on effective time delay pattern," Opt. Express 21, 25700-25707 (2013).

[29] Y. Chen, X. Yu, H. Chi, X. Jin, X. Zhang, S. Zheng, and M. Galili, "Compressive sensing in a photonic link with optical integration," Opt. Lett. 39, 2222-2224 (2014).

[30] M. H. Asghari and B. Jalali, "Anamorphic transformation and its application to time-bandwidth compression," Appl. Opt. 52, 6735-6743 (2013).

[31] M. H. Asghari and B. Jalali, "Experimental demonstration of optical real-time data compression," Appl. Phys. Lett. 104, 111101 (2014).

[32] B. T. Bosworth and M. A. Foster, "High-speed flow imaging utilizing spectral-encoding of ultrafast pulses and compressed sensing," in CLEO: 2014, OSA Technical Digest (Optical Society of America, 2014), paper ATh4P.3.

[33] A. C. Chan, A. Lau, K. Wong, E. Y. Lam, K. Tsia, and M. Z. Ren, "Two-dimensional spectral-encoding for high speed arbitrary patterned illumination," in CLEO: 2014, OSA Technical Digest (Optical Society of America, 2014), paper STh1H.2.

[34] H. Chen, Z. Weng, Y. Liang, C. Lei, F. Xing, M. Chen, and S. Xie, "High speed single-pixel imaging via time domain compressive sampling," in CLEO: 2014, OSA Technical Digest (Optical Society of America, 2014), paper JTh2A.132.

[35] A. C. S. Chan, E. Y. Lam, and K. K. Tsia, "Signal reduction in fluorescence imaging using radio frequency-multiplexed excitation by compressed sensing," in Real-time Photonic Measurements, Data Management, and Processing, B. Jalali, M. Li, K. Goda, and M. H. Asghari, eds., Proc. SPIE 9279, 92790U (2014).

[36] M. W. Marcellin, JPEG2000: Image Compression Fundamentals, Standards, and Practice (Springer, 2002).

[37] S. Mallat, A Wavelet Tour of Signal Processing: The Sparse Way (Academic, 2008).

[38] D. Takhar, J. N. Laska, M. B. Wakin, M. F. Duarte, D. Baron, S. Sarvotham, K. F. Kelly, and R. G. Baraniuk, "A new compressive imaging camera architecture using optical-domain compression," Proc. SPIE 6065, 606509 (2006).

[39] F. Magalhâes, F. M. Aráujo, M. V. Correia, M. Abolbashari, and F. Farahi, "Active illumination single-pixel camera based on compressive sensing," Appl. Opt. 50, 405-414 (2011).

[40] V. Studer, J. Bobin, M. Chahid, H. S. Mousavi, E. Candès, and M. Dahan, "Compressive fluorescence microscopy for biological and hyperspectral imaging," Proc. Natl. Acad. Sci. U.S.A. 109, E1679-E1687 (2012).

[41] S. A. Diddams, L. Hollberg, and V. Mbele, "Molecular fingerprinting with the resolved modes of a femtosecond laser frequency comb," Nature 445, 627-630 (2007).

[42] J. Yang, X. Yuan, X. Liao, P. Llull, D. Brady, G. Sapiro, and L. Carin, "Video compressive sensing using gaussian mixture models," IEEE Trans. Image Process. 23, 4863-4878 (2014).

[43] D. Solli, J. Chou, and B. Jalali, "Amplified wavelength-time transformation for real-time spectroscopy," Nature Photon. 2, 48-51 (2007).

[44] J. Xu, C. Zhang, J. Xu, K. K. Y. Wong, and K. K. Tsia, "5 MHz all-optical swept-source optical coherence tomography based on amplified dispersive fourier transform," in Optics in the Life Sciences, OSA Technical Digest (Optical Society of America, 2013), paper NW5B.5.

[45] M. Mishali, Y. Eldar, and A. Elron, "Xampling: Signal acquisition and processing in union of subspaces," IEEE Trans. Signal Process 59, 4719-4734 (2011).

Example 3

High-Speed 1-D Flow Imaging Utilizing Spectral-Encoding of Ultrafast Pulses and Compressed Sensing Imaging by spatially mapping the spectra of ultrafast laser pulses onto test subjects and then highly chirping and amplifying the pulses to perform a dispersive Fourier transform before output photodetection and analog-to-digital conversion has been demonstrated as a successful approach to high-speed imaging at a 6.1 MHz framerate [1]. However, such an approach suffers from reduced signal-to-noise ratio (SNR) due to the large amount of optical amplification required after illuminating the test subject, and the very high-speed analog-to-digital converter (ADC) required at the output is generally limited in its effective number of bits (ENOB) and prohibitively expensive.

Compressed sensing (CS) has emerged in recent years as an attractive solution for building compression directly into the acquisition of real signals, alleviating the need for traditional Shannon/Nyquist sampling at rate greater than or equal to twice the signal bandwidth followed by a compression procedure that generally throws away much of the data that the device spent the effort to acquire [2]. Because high-speed imaging requires a tremendous amount of information bandwidth to achieve MHz frame rates, we expect that it will be a very productive application for compressed sensing.

The most representative system to employ compressed sensing for imaging is the single pixel camera architecture which utilizes structured illumination to achieve optical domain compression [3]. The present system can be viewed as a novel adaptation of this architecture to chirp processing of ultrafast laser pulses for a reduction of several orders of magnitude in acquisition time. Spectral-encoding of the pseudorandom patterns for compressed sensing onto ultrafast pulses has been experimentally demonstrated for the detection of sparse radio frequency signals [4, 5]. However, to our knowledge this is the first demonstration of high-speed spectrally-encoded imaging to employ compressed sensing.

Experimental System

Figure 16:
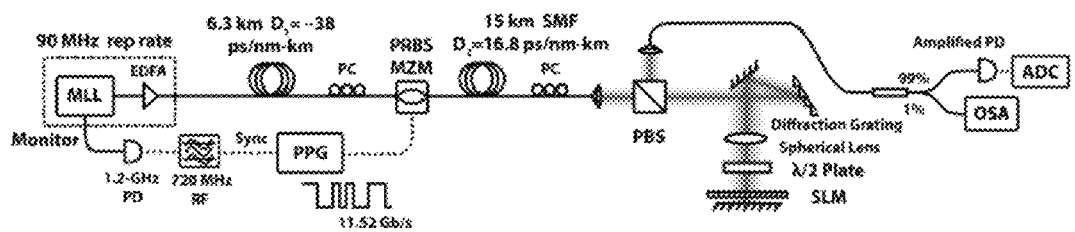
FIG. 16 provides a schematic illustration of a compressed imaging system according to some embodiments of the invention.

In the system presented here (FIGS. 4, 16), pseudorandom bit sequence (PRBS) patterns are encoded onto the spectra of ultrafast mode-locked laser (MLL) pulses with a unique pattern for each pulse. These pulses then serve as structured illumination inside of a 1-D wavelength-to-spatial mapping filter. To encode a measurement pattern on each optical pulse, the system employs a length of normal dispersion fiber to perform optical wavelength-to-time mapping, spreading the pulse spectrum (which spans 30 nm at −6 to −7 dB) over 8.5 ns in time before PRBS modulation in a Mach-Zehnder intensity modulator (MZM) driven by a programmable pulse generator (PPG). After modulation, the pulses are fully compressed in time with an anomalous dispersion fiber, yielding high repetition rate (90 MHz) ultra-short pulsed illumination of the test subject. Unlike [1], each compressed pulse acts as a measurement and this permits straightforward photodetection without optical amplification.

For the present experiment, customized 1-D test patterns were achieved with a 128-pixel spatial light modulator in a four-f pulse shaper after the compression stage. The system approximates a flow by acquiring multiple 1-D images of different SLM patterns and then stacking them after compressed sensing reconstruction.

Results

We demonstrate (FIGS. 17A-17C) 100 pixel CS reconstructions of test images with different types of sparsity using samples acquired at the 90 MHz MLL repetition rate. Notably, we achieve accurate reconstructions with far fewer samples than would be required for traditional Nyquist sampling. The reconstruction in FIG. 17B was acquired at 5× below the Nyquist rate and the reconstruction in FIG. 17C was acquired at 4× below the Nyquist rate.

Compressed sensing works by projecting an unknown signal x of length N onto a set of known pseudorandom measurement waveforms Ok (also of length N) such that $y_k = \langle x, \phi_k \rangle$, where k =1 . . . M and M<N. Afterward, the M measurements and corresponding pseudorandom waveforms are input to a nonlinear reconstruction algorithm to recover the unknown signal. To faithfully reconstruct a test signal, it should be sparse in a known basis T. Which basis is most appropriate does not affect the acquisition process because pseudorandom measurement waveforms have very low correlation with any fixed basis [6]. The results presented above demonstrate accurate reconstruction utilizing two different kinds of sparsity. FIG. 17B was reconstructed by minimizing the total variation (the summed magnitude of the discrete gradient) subject to the $y_k = \langle x, \phi_k \rangle$, constraint. FIG. 17C was reconstructed by minimizing the $l_1$ norm of the discrete cosine transform (DCT) of the candidate image.

Figure 17A:
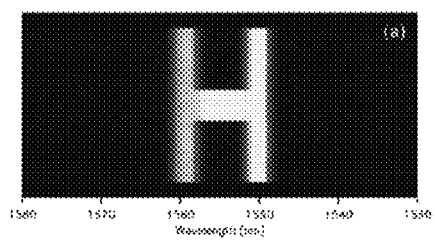
FIG. 17A shows an image of an 'H' acquired by computing the difference between the output optical spectra with and without the test subject.
Figure 17B:
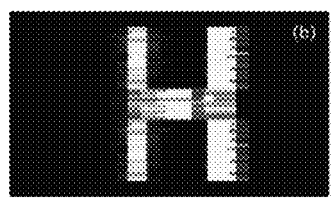
FIG. 17B is a reconstruction of the 'H' (50×100 pixels, N=100, M=20) using TV minimization.
Figure 17C:
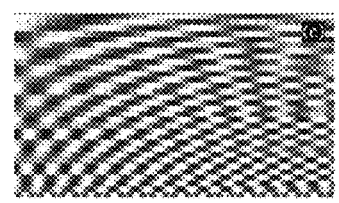
FIG. 17C shows a reconstruction of a sinusoidal test pattern (31×100 pixels, N=100, M=25) with linearly increasing frequency from top to bottom using $l_1$ minimization of the DCT.

Each row of pixels in the images in FIGS. 17A-17C could be acquired on the order of 200 ns. However, this must not be considered a fixed number. Single pixel cameras, including this one, can be used as shutterless video imaging devices that take advantage of the natural compressibility of smooth motions of objects that appear across multiple samples [3]. That is, a video stream from this device would not have to acquire a distinct set of M images for every single frame.

References—Example 3

[1] K. Goda, K. K. Tsia, and B. Jalali, "Serial time-encoded amplified imaging for real-time observation of fast dynamic phenomena." Nature 458, 1145 (2009).

[2] M. A. Davenport, M. F. Duarte, Y. C. Eldar, and G. Kutyniok, "Introduction to compressed sensing," in "Compressed Sensing: Theory and Applications,", Y. C. Eldar and G. Kutyniok, eds. (Cambridge University Press, 2012), pp. 1-68.

[3] M. Duarte, M. Davenport, D. Takhar, J. Laska, T. Sun, K. Kelly, and R. Baraniuk, "Single-pixel imaging via compressive sampling," Signal Processing Magazine, IEEE 25, 83-91 (2008).

[4] G. C. Valley, G. A. Sefler, and T. J. Shaw, "Compressive sensing of sparse radio frequency signals using optical mixing," Opt. Lett. 37, 4675-4677 (2012).

[5] B. T. Bosworth and M. A. Foster, "High-speed ultra-wideband photonically enabled compressed sensing of sparse radio frequency signals," Opt. Lett. 38, 4892-4895 (2013).

[6] E. J. Candès, J. K. Romberg, and T. Tao, "Stable signal recovery from incomplete and inaccurate measure-ments," Communications on Pure and Applied Mathematics 59, 1207-1223 (2006).

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A compressive imaging system, comprising:
an illumination system arranged to illuminate an object of interest with illumination light;
a detection system configured to detect at least a portion of said illumination light after being at least one of reflected from, scattered from, or transmitted through said object of interest or to detect fluorescent light from said object of interest and to provide an imaging signal; and
an image processing system configured to communicate with said detection system so as to receive said imaging signal,
wherein said illumination light from said illumination system comprises a plurality of light pulses such that each light pulse has a preselected spectrum that is distinguishable from spectra of all other pulses of said plurality of light pulses, and
wherein said image processing system is configured to form an image of said object of interest using information concerning said preselected spectra of said plurality of light pulses.

2. A compressive imaging system according claim 1, wherein said detection system is a single pixel photodetector system.

3. A compressive imaging system according claim 1, wherein said image processing system is configured to processes the imaging signal to form blocks of pixels, wherein the image processing system selects the blocks of pixels based on local image structures.

4. An imaging flow cytometry system, comprising:
a flow channel; and
a compressive imaging system according to claim 1.

5. A compressive imaging system, comprising:
an illumination system arranged to illuminate an object of interest with illumination light;
a detection system configured to detect at least a portion of said illumination light after being at least one of reflected from, scattered from, or transmitted through said object of interest or to detect fluorescent light from said object of interest and to provide an imaging signal; and
an image processing system configured to communicate with said detection system so as to receive said imaging signal,
wherein said illumination system comprises:
a broadband pulsed light source configured to provide a plurality of illumination pulses,
a first dispersion component optically coupled with said broadband pulsed light source to receive said plurality of illumination pulses therefrom to provide a corresponding plurality of dispersed pulses, each having optical dispersion imparted thereto by said first dispersion component,
an optical modulator arranged to modulate each pulse of said plurality of dispersed pulses to provide said preselected spectra such that each pulse is distinguishable from all other pulses of said plurality of light pulses, and
a second dispersion component arranged to receive each of said plurality of dispersed pulses after being modulated, said second dispersion component acting to substantially cancel dispersion imposed by said first dispersion component to provide a plurality of undispersed illumination pulses having mutually distinguishable spectra,
wherein said illumination light from said illumination system comprises a plurality of light pulses such that each light pulse has a preselected spectrum that is distinguishable from spectra of all other pulses of said plurality of light pulses, and
wherein said image processing system is configured to form an image of said object of interest using information concerning said preselected spectra of said plurality of light pulses.

6. A compressive imaging system according to claim 5, wherein said optical modulator has a switching time that is at least several times faster than a temporal length of said plurality of dispersed pulses.

7. A compressive imaging system according to claim 5, wherein said optical modulator is configured to modulate each pulse of said plurality of dispersed pulses to provide said preselected spectra such that each pulse has a pseudo-random, binary spectral distribution.

8. A compressive imaging system according claim 5, wherein said illumination system further comprises:
a wavelength-to-space mapping diffraction grating arranged in an optical path between said broadband pulsed light source and said object of interest, and
a lens system disposed between said wavelength-to-space mapping diffraction grating and said object of interest to focus diffracted light from said wavelength-to-space mapping diffraction grating onto said object of interest.

9. A compressive imaging system according to claim 5, wherein said first and second dispersion components are optical fibers.

10. A compressive imaging system according to claim 5, wherein said optical modulator is an electro-optic optical modulator.

11. A compressive imaging system according to claim 10, wherein said electro-optic optical modulator is a Mach-Zehnder modulator.

12. A compressive imaging system, comprising:
an illumination system arranged to illuminate an object of interest with illumination light;
a detection system configured to detect at least a portion of said illumination light after being at least one of reflected from, scattered from, or transmitted through said object of interest or to detect fluorescent light from said object of interest and to provide an imaging signal; and
an image processing system configured to communicate with said detection system so as to receive said imaging signal,
wherein said illumination light from said illumination system comprises a plurality of light pulses such that each light pulse has a preselected spectrum that is distinguishable from spectra of all other pulses of said plurality of light pulses,
wherein said image processing system is configured to form an image of said object of interest using information concerning said preselected spectra of said plurality of light pulses, and
wherein said image processing system is configured to form said image of said object of interest using a global iterative recovery process, wherein the image comprises a plurality of local regions, and wherein said global iterative recovery process optimizes each of said plurality of local regions to be sparse.

13. A compressive imaging system according to claim 12, wherein the global iterative recovery process recovers a particular region of interest of the object of interest illuminated with illumination light.

14. A compressive imaging method, comprising:
illuminating an object of interest with illumination light;
detecting at least a portion of said illumination light after being at least one of reflected from, scattered from, or transmitted through said object of interest or detecting fluorescent light from said object of interest and to provide an imaging signal; and
processing said imaging signal to provide an image of said object of interest,
wherein said illumination light comprises a plurality of light pulses such that each light pulse has a preselected spectrum that is distinguishable from spectra of all other pulses of said plurality of light pulses, and
wherein said image processing system is configured to form an image of said object of interest using information concerning said preselected spectra of said plurality of light pulses.

15. A compressive imaging method according to claim 14, wherein illuminating the object of interest with illumination light comprises directing the illumination light at a plurality of regions of the object of interest.

16. A compressive imaging method, comprising:
illuminating an object of interest with illumination light;
detecting at least a portion of said illumination light after being at least one of reflected from, scattered from, or transmitted through said object of interest or detecting fluorescent light from said object of interest and to provide an imaging signal; and
processing said imaging signal to provide an image of said object of interest,
wherein said illumination light comprises a plurality of light pulses such that each light pulse has a preselected spectrum that is distinguishable from spectra of all other pulses of said plurality of light pulses,
wherein said image processing system is configured to form an image of said object of interest using information concerning said preselected spectra of said plurality of light pulses, and
wherein processing said image signal to provide an image of said object of interest comprises using a global iterative recovery process, wherein the image comprises a plurality of local regions, and wherein said global iterative recovery process optimizes each of said plurality of local regions to be sparse.

17. A compressive imaging method according to claim 16, wherein the global iterative recovery process recovers a particular region of interest of the object of interest illuminated with illumination light.

* * * * *